(12) United States Patent
Marck et al.

(10) Patent No.: US 7,034,098 B2
(45) Date of Patent: Apr. 25, 2006

(54) PHOTOACTIVE POLYMER

(75) Inventors: Guy Marck, Schlierbach (FR);
Richard Buchecker, Zurich (CH);
Olivier Muller, Lautenbach (FR)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 10/470,952

(22) PCT Filed: Feb. 4, 2002

(86) PCT No.: PCT/CH02/00056

§ 371 (c)(1),
(2), (4) Date: Mar. 8, 2004

(87) PCT Pub. No.: WO02/062873

PCT Pub. Date: Aug. 15, 2002

(65) Prior Publication Data

US 2004/0185215 A1    Sep. 23, 2004

(30) Foreign Application Priority Data

Feb. 5, 2001    (EP) ................... 01810112

(51) Int. Cl.
*C08G 73/00*    (2006.01)
*C08G 75/00*    (2006.01)
*C08J 3/28*    (2006.01)
*B32B 3/02*    (2006.01)

(52) U.S. Cl. ............ 528/170; 528/310; 528/350; 528/353; 528/272; 528/373; 528/391; 522/162; 522/165; 428/1.1; 428/1.26; 428/411.1; 428/473.5; 428/64.4; 525/437; 525/444

(58) Field of Classification Search ............... 528/170, 528/353, 272, 373, 391, 322, 350, 310; 522/162; 522/165; 428/1.1, 1.26, 473.5, 64.4, 411.1; 525/437, 444
See application file for complete search history.

(56) References Cited

U.S. PATENT DOCUMENTS 5,976,640 A    11/1999    Yu et al.
6,340,506 B1 *    1/2002    Buchecker et al. .......... 428/1.26
6,649,230 B1 *    11/2003    Seiberle et al. ............. 428/1.2
6,831,148 B1 *    12/2004    Buchecker et al. .......... 528/310

FOREIGN PATENT DOCUMENTS

WO    WO 99/15576    4/1999

* cited by examiner

*Primary Examiner*—P. Hampton Hightower
(74) *Attorney, Agent, or Firm*—Sughrue Mion, PLLC

(57) ABSTRACT

A photoactive side-chain polymer from the class of polyimides, polyamide acids and esters thereof, comprising as a side-chain a dendritic block incorporating photoactive groups at its surface. The dendritic block preferably represents a unit of formulae Ia, Ib or a combination of them, for example formulae Ic, wherein the broken line symbolizes the linkage to the polyimide main chain.

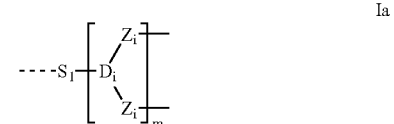

Ia

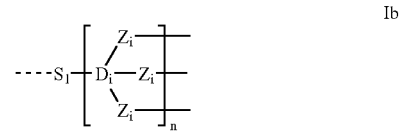

Ib

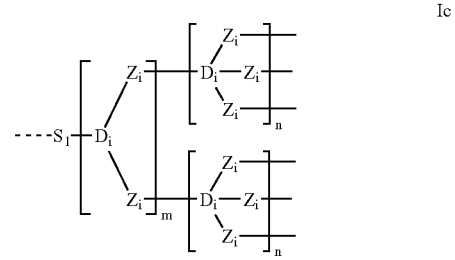

Ic

The polymer may be used as an orientation layer for liquid crystals and in the construction of unstructured and structured optical elements and multi-layer systems.

71 Claims, No Drawings

PHOTOACTIVE POLYMER

This application is a national stage filing under 35 U.S.C. § 371 of international application no. PCT/CH02/00056, filed on Feb. 4, 2002. This application claims the benefit of priority under 35 U.S.C. § 119(a) to European patent application no. 01 810 112.1 filed on Febr. 5, 2001.

The present invention relates to a photoactive polymer based on polyimides, polyamic acids and esters thereof and their use as orientation layers for liquid crystals and in the construction of unstructured and structured optical elements and multi-layer systems.

The successful functioning of a liquid crystal device depends on the ability of the liquid crystal molecules within that device to adopt and maintain an imposed alignment. Alignment of the liquid crystal molecules is achieved by use of an orientation layer which defines a direction of orientation for the liquid crystal molecules of the device with the result that the longitudinal axes of the molecules become aligned with the direction of orientation defined by the orientation layer. In addition to this directional alignment, the orientation layer is also able to impart to the liquid crystal molecules an angle of tilt so that the molecules align themselves at an angle to the surface of the orientation layer rather than lying parallel hereto.

Tilt angles from 1° to 15° are usual for nematic liquid crystal displays (LCDs). Some electro-optical effects used for LCDs however require alignment layers with very high pretilt angles. Vertically aligned nematic (VAN) LCDs for instance require pretilt angles between 85° and 90°, measured from the surface plane. In the case of hybrid aligned nematic (HAN) LCDs, the pretilt angle at one of the substrates has to be in the above range, whereas the tilt angle at the other substrate is low (typically 0° to 10°). Methods of preparing structured and unstructured orientation layers are well known to a skilled person. Customarily used uniaxially rubbed polymer orientation layers such as, for example, polyimides however impact a series of disadvantages like dust generation during the rubbing process, destruction of thin film transistors and lack of structuring ability. Furthermore, the rubbing process does not allow the production of structured layers.

Orientation layers in which the direction of orientation can be predetermined by irradiation with polarized light have been known for some time. It is by that means possible to avoid the problems inherent to the rubbing process. In addition, it is possible to provide areas having different orientation and thus to structure the orientation layer as described for example in Jpn. J. Appl. Phys., 31 (1992), 2155–64 (Schadt et al.). In that process the dimerisation of polymer-bonded photoactive cinnamic acid groups induced by irradiation with linearly polarized light is employed leading to an anisotropic polymer network. Those photo-oriented polymer networks can be used wherever structured or unstructured liquid crystal orientation layers are required.

In addition to their use in LCDs, such orientation layers can also be used, for example, in the production of so-called hybrid layers, as exemplified for instance in European patent applications EP-A-0611981, EP-A-0689084 (both F. Hoffmann-La Roche AG) and WO-A-98/52077 (Rolic A G). Using those hybrid layers of photostructurable orientation polymers and crosslinkable low molecular weight liquid crystals it is possible to realize optical elements such as, for example, non-absorptive color filters, linear and circular polarizers, optical delay layers and so on.

EP-A-0611786 and WO-A-96/10049 (both F. Hoffmann-La Roche AG), as well as EP-A-0763552 (Rolic AG), describe cinnamic acid polymers that are suitable in principle for the synthesis of such anisotropically crosslinked, photo-structured orientation layers for liquid crystals. In the case of the compounds described in EP-A-0763552 and WO-A-96/10049, on irradiation with linearly polarized light it is possible to induce, in addition to the desired orientation, simultaneously an angle of tilt. This allows the production of layers having structuring in respect of surface orientation and angle of tilt.

The above photostructurable orientation layers have the disadvantage, however, that for certain applications, especially for use in Thin Film Transistor (TFT) displays, they result in adjacent liquid crystal mixture having an insufficient electrical resistivity value. In TFT displays, a too low resistivity value of the liquid crystal medium leads to an inadequate "holding ratio", which is a measure of the voltage drop in the display after the voltage has been switched off. Low holding ratio values, however, bring about undesirable changes in brightness and contrast over time and thus result in unstable graduations of the grey tones.

Recently photoactive materials for orientation layers with improved holding ratios were described in WO-A-99/49360 (Rolic AG), JP-A-10-195296, JP-A-10-232400 (both Samsung Electron Devices Co., Ltd.), WO-A-99/15576 (Rolic AG) and WO-A-99/51662 (Kanegafuchi Kagaku Kogyo KK). In WO-A-99/49360, JP-A-10-195296 and JP-A-10-232400 blends of polymeric compounds containing photo-active polymers on the one hand and polyimides on the other hand are proposed. A disadvantage of such blends is their limited miscibility. Low contents of photoactive polymers however lead to a loss of orienting properties and consequently to a reduced contrast ratio of liquid crystal layers to be oriented whereas a reduced polyimide content results in insufficient holding ratios. In WO-A-99/15576 and WO-A-99/51662 polyimides incorporating photoactive cinnamate groups in their side chains are described. WO-A-99/15576 discloses photoactive polymers which contain as side-chains photo-crosslinkable groups of the following formula:

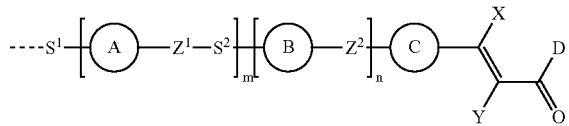

These polyimides are said to combine the photoreactivity of the cinnamic acid skeletal structure and sufficiently high holding ratios. There is no teaching of the improvement of the orientation of liquid crystals. A problem with the polyimides is their poor solubility in the most organic solvents that make them difficult to process.

The ability of the resulting orientation layers to perform their function depends, in part, on the number of molecules in the layer that have been isomerised and/or dimerised as a result of irradiation with linearly polarized light. The extent to which the molecules are isomerised and/or dimerised relies, in part, on the irradiation time, the irradiation energy and the structure of the molecules being irradiated.

However, a problem with many polymers currently used in the preparation of photo-oriented orientation layers is that relatively long irradiation times are required to make efficient isomerisation and/or dimerisation of the component molecules.

Consequently, there is a need for stable photoalignable materials with short irradiation time, sufficiently high holding ratios and good processability. The present invention addresses that need and provides photoactive polymers of good processability that, when irradiated over a relatively short time with polarized light, result in stable, high-resolution patternable orientation layers having angle of tilt, which at the same time allow sufficiently high holding ratios in the adjacent liquid crystal medium.

The inventors have found that polyimides incorporating as side-chains dendritic blocks with photoactive groups at their surface provide photoalignable materials which are advantageous with respect to at least one of the above requirements. The illumination of these compounds with linearly polarized light results in excellent orientation capability for liquid crystals, in sufficiently high holding ratio and simultaneously allows pre-tilt angles up to 90°. At the same time, the introduction of a dendritic block improves solubility and processability.

A first aspect of the present invention therefore provides photoactive polymers from the class of polyimides, polyamide acids and esters thereof, characterized in that they comprise as side-chains a dendritic block incorporating photoactive groups at its surface.

The dendritic block preferably represents a unit of formulae Ia, Ib or a combination of them, for example formula Ic

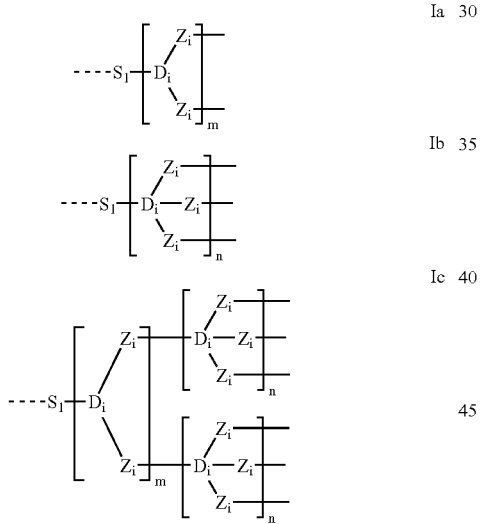

wherein the broken line symbolizes the linkage to polyimide main chain; and wherein $S_1$ represents a single bond or a spacer unit such as a straight-chain or branched alkylene group which is unsubstituted, mono or poly-substituted by fluorine, chlorine, having 1 to 30 carbon atoms, wherein one or more —$CH_2$— groups may independently be replaced by a group A, with the proviso that oxygen atoms are not directly attached to each other, wherein A represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —Si($CH_3$)$_2$—O—Si($CH_3$)$_2$—, an aromatic or an alicyclic group, and wherein $R^1$ represents a hydrogen atom or lower alkyl;

$D_i$ each independently of the other represent an organic residue;

$Z_i$ each independently of the other represent a single bond or a spacer unit such as a straight-chain or branched alkylene group which is unsubstituted, mono or poly-substituted by fluorine, chlorine, having 1 to 24 carbon atoms, wherein one or more non-adjacent —$CH_2$— groups may independently be replaced by a group B, wherein B represents a group selected from —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —Si($CH_3$)$_2$—O—Si($CH_3$)$_2$—, wherein $R^1$ represents a hydrogen atom or lower alkyl;

m and n each independently of the other represent the number of generations and having a value of 0 to 4, with the proviso that $2 \leq m+n \leq 4$, i.e. that at least two generations and at most four generations are present.

For example, the $3^{rd}$ generation of formula Ia is represented by the general formula II

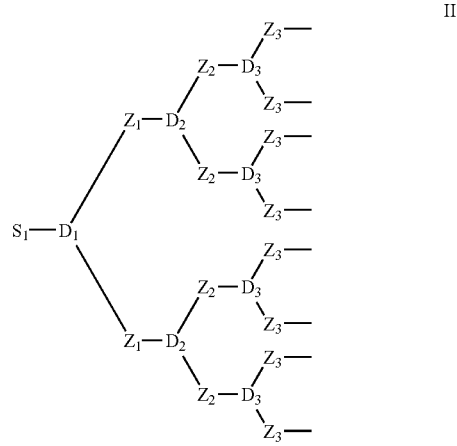

The terminal moieties attached to $Z_i$ at the dendritic block surface are photoactive groups which can be photoisomerised or photodimerised on exposure to UV or laser light. The terminal moieties can also be hydrogen, or an unit such as a straight-chain or branched alkyl group which is unsubstituted, mono or poly-substituted by fluorine, chlorine, cyano, having 1 to 24 carbon atoms, wherein one or more —$CH_2$— groups may independently be replaced by a group A, with the proviso that oxygen atoms are not directly attached to each other; with the proviso that at least four terminal moieties must be photoactive groups.

By the term "aromatic" it should be understood to include optionally substituted carbocyclic and heterocyclic groups incorporating five, six or ten ring atoms like furan, phenyl, pyridine, pyrimidine, naphthalene, or tetraline units.

By the term "cyclic, straight-chain or branched alkyl residue which is unsubstituted, mono-substituted by cyano or fluorine, chlorine, or poly-substituted by fluorine, chlorine, having 1 to 24 carbon atoms, wherein one or more non-adjacent —$CH_2$— groups may independently be replaced by a group A," it should be understood to include groups selected from the group comprising methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, undecyl, dodecyl, 3-methylpentyl, allyl, but- 3-en-1-yl, pent-4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, decyloxy, undecyloxy, dodecyloxy, 3-methylpentyloxy, allyloxy, but-3-enyloxy, pent-4-enyloxy, cylohexylmethoxy, cyclopentylmethoxy, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, cyclopentyloxycarbonyl, hexyloxycarbonyl, cyclohexyloxycarbonyl, octyloxycarbonyl, nonyloxycarbonyl, decyloxycarbonyl, undecyloxycarbonyl, dodecyloxycarbonyl, 3-methylpentyloxycarbonyl, allyloxycarbonyl, but-3-enyloxycarbonyl, pent-4-enyloxycarbonyl, cylohexylmethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, 4-[3,4,5-tris(octyloxy)benzyl]oxy, hexylcarbonyloxy, cyclohexylcarbonyloxy, (4-propylcyclohexyl)methoxy, (4-propylcyclohexyl)carbonyloxy, (4-pentylbenzoyl)oxy, octylcarbonyloxy, nonylcarbonyloxy, decylcarbonyloxy, undecylcarbonyloxy, dodecylcarbonyloxy, 3-methylpentylcarbonyloxy, but-3-enyloxy, pent-4-enyloxy, acetyl, ethylcarbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octylcarbonyl, nonylcarbonyl, decylcarbonyl, undecylcarbonyl, dodecylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butynyloxy, 4-pentynyloxy, 5-chloropentynyl, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadecafluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl, 1-fluoropropoxy, 1-fluoropentyloxy, 2-fluoropeapoxy, 2,2-difluoropropoxy, 3-fluoropropoxy, 3,3-difluoropropoxy, 3,3,3-trifluoropropoxy, trifluoromethoxy and the like.

By the term "cyclic, straight-chain or branched alkylene residue which is unsubstituted, mono-substituted by cyano or fluorine, chlorine, or poly-substituted by fluorine, chlorine, having 1 to 24 carbon atoms, wherein one or more non-adjacent —$CH_2$— groups may independently be replaced by a group A," it should be understood to include groups selected from the group comprising 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy, 2-{4-[4-(2-oxy-ethylene)cyclohexyl]phenyl}ethyleneoxy, 2-[4'-(2-oxy-butylene)-1,1'biphenyl-4-yl]ethyleneoxy, 2-{4-[4-(2-oxy-ethylene)phenyl}ethyleneoxy, 2-{4-[4-(2-carbonyloxyethylene)cyclohexyl]phenyl}ethoxy, 2-[4'-(2-carbonyloxybutylene)-1,1'biphenylene-4-yl]ethyleneoxy, 6-{4-[4-(2-carbonyloxyethylene)phenyl}hexyleneoxy, 5-{[4'-(4-oxybuteneoxy)-1,1'-biphenyl-4-yl]oxy}pentenecarbonyloxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxydarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene and the like.

By the term "lower alkyl" it should be understood to include straight chain and branched hydrocarbon radicals having from 1 to 6 carbon atoms, preferably from 1 to 3 carbon atoms. Methyl, ethyl, propyl and isopropyl groups are especially preferred.

By the term "alicyclic" it should be understood to include non-aromatic carbocyclic or heterocyclic ring systems with 3 to 10 carbon atoms like cyclopropane, cyclobutane, cyclopentane, cyclopentene, cyclohexane, cyclohexene, cyclohexadiene and decaline.

Especially preferred dendritic blocks are groups of formulae Ia and Ic.

Most preferred dendritic blocks are groups of formulae Ia.

It is also preferred that the groups $D_i$ are each independently of the other an aromatic, an alicyclic or a —$CR^1$ unit wherein $R^1$ is as defined above.

It is especially preferred that the groups $D_i$ are selected form 1,2,3-benzenetriyl, 1,3,4-benzenetriyl, 1,3,5-benzenetriyl or a group —$CR^1$.

It is preferred that the group $S_1$ is selected from a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and a straight-chain or branched alkylene group, which is optionally substituted by one or more groups selected from fluorine, chlorine and cyano and in which two or three non-adjacent alkylene —$CH_2$— group are independently optionally replaced by a group A with the proviso that the total number of chain carbon atoms in the alkylene group does not exceed 24, wherein $R^1$ represents a hydrogen atom or lower alkyl.

It is more preferred that $S_1$ is selected from single covalent bond, —CO—O—, —O—CO—, —$(CH_2)_r$—, —$(CH_2)_r$—O—, —$(CH_2)_r$—CO—, —$(CH_2)_r$—CO—, —$(CH_2)_r$—CO—O, —$(CH_2)_r$—O—CO—, —$(CH_2)_r$—CO—$NR^1$—, —$(CH_2)_r$—$NR^1$—CO—, —$(CH_2)_r$—$NR^1$—, —O—$(CH_2)_r$—, —CO—O—$(CH_2)_r$—, —O—CO—$(CH_2)_r$—, —$NR^1$—CO—$(CH_2)_r$—, —CO—$NR^1$—$(CH_2)_r$—, —$NR^1$—$(CH_2)_r$—, —O—$(CH_2)_r$—CO—O—, —O—$(CH_2)_r$—O—CO—, —O—$(CH_2)_r$—CO—$NR^1$—, —O—$(CH_2)_r$—$NR^1$—, —O—$(CH_2)_r$—O—, —O—$(CH_2)_r$—$NR_1$—CO—, —$NR^1$—$(CH_2)_r$—CO—O—, —$NR^1$—$(CH_2)_r$—O—, —$NR^1$—$(CH_2)_r$—$NR^1$—, —$NR^1$—$(CH_2)_r$—O—CO—, —CO—$NR^1$—$(CH_{2r}$—O—, —CO—$NR^1$—$(CH_2)_r$—$NR^1$—, —CO—$NR^1$—$(CH_2)_r$—O—CO—, —O—CO—$(CH_2)_r$—CO—, —O—CO—$(CH_2)_r$—O—, —O—CO—$(CH_2)_r$—$NR^2$—, —O—CO—$(CH_2)_r$—CO—O—, —O—CO—$(CH_2)_r$—CO—$NR^1$—, —O—CO—$(CH_2)_r$—$NR^1$—CO—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^1$—CO—$(CH_2)_s$—, —$(CH_2)_r$—$NR^1$—CO—O—$(CH_2)_s$—, —$(CH_2)_r$—O—$(CH_2)_s$—O—, —$(CH_2)_r$—CO—O—$(CH_2)_s$—O, —$(CH_2)_s$—O, —$(CH_2)_r$—O—CO—$(CH_2)_s$—O, —$(CH_2)_r$—$NR^1$—CO—$(CH_2)_s$—O, —$(CH_2)_r$—$NR^1$—CO—O—$(CH_2)_s$—O, —O—$(CH_2)_r$—O—$(CH_2)_s$—, —O—$(CH_2)_r$—CO—O—$(CH_2)_s$—, —O—$(CH_2)_r$—$NR^1$—CO—$(CH_2)_s$—, —O—$(CH_2)_r$—$NR^1$—CO—O—$(CH_2)_s$—, —O—$(CH_2)_r$—COO—$(CH_2)_s$—O—, —O—$(CH_2)_r$—O—$(CH_2)_s$—O—, —O—$(CH_2)_r$—$NR^1$—CO—$(CH_2)_s$—O, —O—$(CH_2)_r$—$NR^1$—CO—O—$(CH_2)_s$—O, —CO—O—$(CH_2)_r$—O—$(CH_2)_s$— and —CO—O—$(CH_2)_r$—O—$(CH_2)_s$—O—, wherein $R^1$ is as defined above, r and s each represent an integer from 1 to 20, preferably from 2 to 12, and r+S≦21, preferably ≦15.

By the terms —$(CH_2)_r$— and —$(CH_2)_s$— it should be understood to include straight-chain or branched alkylene groupings containing r or s carbon atoms respectively.

It is especially preferred that $S_1$ is selected from —$(CH_2)_r$—, —$(CH_2)_r$—O—, —$(CH_2)_r$—CO—O—, —$(CH_2)_r$—O—CO—, —$(CH_2)_r$—CO—NH—, —$(CH_2)_r$—NH—CO—, —O—$(CH_2)_r$—, —CO—O—$(CH_2)_r$—, —CO—NH—$(CH_2)_r$—, —O—CO—$(CH_2)_r$—, —O—$(CH_2)_r$—O—CO—, —O$(CH_2)_r$CO—NH—, —O—$(CH_2)_r$—NH—CO—, —CO—O—$(CH_2)_r$—O—, —CO—NH—$(CH_2)_r$—O—, —O—$(CH_2)_r$—O—, —$(CH_2)_r$—NH—CO—$(CH_2)_s$—, —$(CH_2)_r$—NH—CO—O—$(CH_2)_s$—, —$(CH_2)_r$—O—$(CH_2)_s$—O—, —$(CH_2)_r$—NH—CO—O—, —$(CH_2)_r$—NH—CO—O—$(CH_2)_s$—O—, —O—$(CH_2)_s$—NH—CO—$(CH_2)_s$—, —O—$(CH_2)_r$—O—$(CH_2)_s$—O—, —O—CO—$(CH_2)_r$—O—$(CH_2)_s$—O—, —O—$(CH_2)_r$NH—CO—$(CH_2)_s$—O— and —O—CO—$(CH_2)_r$—NH—CO—$(CH_2)_s$—O—, wherein r and s each represent an integer from 2 to 12 and r+s≦15.

Examples of preferred groups $S_1$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(,carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene and the like.

It is preferred that the groups $Z_i$ are selected from a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and a straight-chain or branched alkylene group in which one to three non-adjacent alkylene —$CH_2$— group are independently optionally replaced by a group —O—, —CO—O—, —O—CO—, —CH=CH—, with the proviso that the total number of chain carbon atoms in the alkylene group does not exceed 16, wherein $R^1$ represents a hydrogen atom or lower alkyl.

It is especially preferred that the groups $Z_i$ are selected form a single covalent bond, —O—, —CO—O—, —O—CO—, —$NR^1$—CO—, —CO—$NR^1$—, and a straight-chain or branched alkylene group in which one to three non-adjacent alkylene —$CH_2$— group are independently optionally replaced by a group —O—, —CO—O—, —O—CO—, with the proviso that the total number of chain carbon atoms in the alkylene group does not exceed 12, wherein $R^1$ represents a hydrogen atom or lower alkyl.

The photoactive groups preferably undergo photocyclisation reactions and are represented by the general formulae IIIa and IIIb:

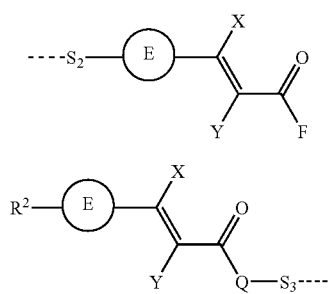

wherein the broken line indicates the point of linkage to $Z_i$; and wherein $S_2$ and $S_3$ each independently of the other represent a single bond or a spacer unit such as a straight-chain or branched alkylene group which is unsubstituted, mono or poly-substituted by fluorine, chlorine, having 1 to 30 carbon atoms, wherein one or more non-adjacent —$CH_2$— groups may independently be replaced by a group A, with the proviso that oxygen atoms are not directly attached to each other;

Q represents an oxygen atom or —$NR^1$— wherein $R^1$ represents a hydrogen atom or lower alkyl;

E represents pyrimidine-2,5-diyl, pyridine-2,5-diyl, 2,5-thiophenylene, 2,5-furanylene, 1,4- or 2,6-naphthylene; or phenylene; which is unsubstituted or mono- or poly-substituted by fluorine, chlorine or by a cyclic, straight-chain or branched alkyl residue which is unsubstituted mono- or poly-substituted by fluorine, chlorine, having 1 to 18 carbon atoms, wherein one or more non-adjacent —$CH_2$— groups may independently be replaced by a group B;

F represents —$OR^3$, —$NR^4R^5$ or an oxygen atom, which defines together with the ring E a coumarin unit, wherein $R^3$, $R^4$ and $R^5$ are selected from hydrogen, cyclic, straight-chain or branched alkylene residue which is unsubstituted, mono- or poly-substituted by fluorine, chlorine, having 1 to 24 carbon atoms, wherein one or more non-adjacent —$CH_2$— groups may independently be replaced by a group A, or $R^4$ and $R^5$ together form a $C_{5-8}$ alicyclic ring;

X, Y each independently of the other represents hydrogen, fluorine, chlorine, cyano, alkyl optionally substituted by fluorine having 1 to 12 carbon atoms in which optionally one or more non-adjacent alkyl —$CH_2$— groups are replaced by —O—, —CO—O—, —O—CO— and/or —CH=CH—; and $R^2$ is hydrogen, or is a straight-chain or branched alkyl residue which is unsubstituted, mono-substituted by cyano or fluorine, chlorine, or poly-substituted by fluorine, chlorine, having 1 to 18 carbon atoms, wherein one or more non-adjacent —$CH_2$— groups may independently be replaced by a group A.

It is preferred that the group E is selected from pyrimidine-2,5-diyl, pyridine-2,5-diyl, 2,5-thiophenylene, 2,5-furanylene, 1,4- or 2,6-naphthylene and phenylene, which is unsubstituted or substituted by a cyclic, straight-chain or branched alkyl residue which is unsubstituted, mono- or poly-substituted by fluorine, chlorine having form 1 to 12 carbon atoms in which optionally one or more non-adjacent alkyl —$CH_2$— groups are replaced by —O—, —CO—, —CO—O—, —O—CO—, —CH=CH— and C—C≡C—.

It is especially preferred that E is selected from 2,5-furanylene, 1,4- or 2,6-naphthylene and phenylene; which is unsubstituted or substituted by a cyclic, straight-chain or branched alkyl residue having 1 to 6 carbon atoms in which optionally one or more non-adjacent alkyl —$CH_2$— groups are replaced by —O—, —CO—, —CO—O—, —O—CO—, —CH=CH— and —C≡C—.

By the term "phenylene" it should be understood to include 1,2-, 1,3- or 1,4-phenylene, which is optionally substituted. It is preferred that the phenylene group is either a 1,3- or a 1,4-phenylene. 1,4-phenylene groups are especially preferred.

Preferred groups F are selected from —$OR^3$ and —$NR^4R^5$, wherein $R^3$ and $R^4$ represent a cyclic, straight-chain or branched alkyl residue which is unsubstituted, mono- or poly-substituted by fluorine, chlorine, cyano, having 1 to 18 carbons atoms, wherein one or more non-adjacent alkyl —$CH_2$— groups may independently be replaced by —O— or —CH=CH—, wherein $R^5$ is selected from a hydrogen atom or a cyclic, straight-chain or branched alkyl residue which is unsubstituted, mono- or poly-substituted by fluorine, chlorine, cyano, having 1 to 18 carbons atoms, wherein one or more non-adjacent alkyl —$CH_2$— groups may independently be replaced by —O— or —CH=CH—, or $R^4$ and $R^5$ together to form a $C_{5-8}$ alicyclic ring.

It is especially preferred that F is selected from the group comprising —$OR^3$ or —$NHR^4$, wherein $R^3$ and $R^4$ represent a cyclic, straight-chain or branched alkyl residue which is unsubstituted, mono- or poly-substituted by fluorine atoms, having 1 to 18 carbon atoms, wherein one or more non-adjacent alkyl —CH$_2$— groups may independently be replaced by —O—.

Preferred groups Q are oxygen atom or —NH—.

It is especially preferred that Q is an oxygen atom.

It is preferred that the groups X and Y represent hydrogen.

Preferred photoactive groups are groups of formula IIIa.

It is preferred that the groups S$_2$ and S$_3$ are selected from a single covalent bond, —O—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O—and a straight-chain or branched alkylene group, which is optionally substituted by one or more groups selected from fluorine, chlorine and cyano and in which two or three non-adjacent alkylene —CH$_2$— groups are independently optionally replaced by a group A with the proviso that the total number of chain carbon atoms in the alkylene group does not exceed 24, wherein R$^1$ represents a hydrogen atom or lower alkyl.

It is more preferred that S$_2$ is selected from a single covalent bond, —CO—O—, —O—CO—, —(CH$_2$)$_r$—, —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^1$—, —(CH$_2$)$_r$—NR$^1$—CO—, —(CH$_2$)$_r$—NR$^1$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —O—(CH$_2$)$_r$—CO—O—, —O—(CH$_2$)$_r$—O—CO—, —O—(CH$_2$)$_r$—CO—NR$^1$—, —O—(CH$_2$)$_r$—NR$^1$—, —O—(CH$_2$)$_r$—O—, —O—(CH$_2$)$_r$—NR$^1$—CO—, —NR$^1$—(CH$_2$)$_r$—CO—O—, —NR$^1$—(CH$_2$)$_r$—O—, —NR$^1$—(CH$_2$)$_r$—NR$^1$—, —NR$^1$—(CH$_2$)$_r$—O—CO—, —CO—NR$^1$—(CH$_2$)$_r$—O—, —CO—NR$^1$—(CH$_2$)$_r$—N$^1$—, —CO—NR$^1$—(CH$_2$)$_r$—O—CO—, —O—CO—(CH$_2$)$_r$—CO—, —O—CO—(CH$_2$)$_r$—O—, —O—CO—(CH$_2$)$_r$—NR$^2$—, —O—CO—(CH$_2$)$_r$—CO—O—, —O—CO—(CH$_2$)$_r$—CO—NR$^1$—, —O—CO—(CH$_2$)$_r$—NR$^1$—CO—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$CO—O—(CH$_2$)$_s$—, —(CH$_2$)$_r$—O—(CH$_2$)$_s$O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^1$—CO—(CH$_2$)$_s$—O—, —(CH$_2$)$_r$—NR$^1$CO—O—(CH$_2$)$_s$—O—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$—, —O—(CH$_2$)$_r$—COO—(CH$_2$)$_s$—O—, —O—(CH$_2$)$_r$—O—(CH$_2$)$_s$—O—, —O—(CH$_2$)$_r$—NR$^1$—CO—(CH$_2$)$_s$—O—, —O—(CH$_2$)$_r$—NR$^1$—CO—O—(CH$_2$)$_s$—O—, —CO—O—(CH$_2$)$_r$—O—(CH$_2$)$_s$— and —CO—O(CH$_2$)$_r$—O—(CH$_2$)$_s$—O—, wherein R$^1$ is as defined above, r and s each represent an integer from 1 to 20, preferably from 1 to 12, and r+s≦21, preferably ≦15.

By the terms —(CH$_2$)$_r$— and —(CH$_2$)$_s$— it should be understood to include straight-chain or branched alkylene groupings containing r or s carbon atoms respectively.

It is especially preferred that S$^2$ is selected from a single covalent bond, —(CH$_2$)$_r$—, —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —O—(CH$_2$)$_r$—, —CO—O—(CH$_2$)$_r$—, —CO—NH—(CH$_2$)$_r$—, —O—CO—(CH$_2$)$_r$—, —O—CO—(CH$_2$)$_r$—CO—O—, —O—(CH$_2$)$_r$—O—CO—, —O(CH$_2$)$_r$CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —(CH$_2$)$_r$—NH—CO—(CH$_2$)$_s$—, —(CH$_2$)$_r$—NH—CO—(CH$_2$)$_s$—, —(CH$_2$)$_r$—O—(CH$_2$)$_s$—O—, —(CH$_2$)$_s$—O—, —(CH$_2$)$_r$—NH—CO—(CH$_2$)$_s$—O—, —(CH$_2$)$_r$—NHCO—O—(CH$_2$)$_s$—O—, —O—(CH$_2$)$_r$—NH—CO—(CH$_2$)$_s$—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, —O—(CH$_2$)$_r$,NH—CO—(CH$_2$)$_s$—O—, and —O—CO—(CH$_2$)$_r$—NH—CO—(CH$_2$)$_s$—O—, wherein r and s each represent an integer from 1 to 12 and r+s≦15.

Examples of preferred groups S$^2$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

It is especially preferred that S$_3$ is selected from a single covalent bond, —(CH$_2$)$_r$—, —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^1$—, —(CH$_2$)$_r$—NR$^1$—CO—, —(CH$_2$)$_r$—NR$^1$—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^1$—CO—(CH$_2$)$_s$—O—, —(CH$_2$)$_r$—NR$^1$—CO—O—(CH$_2$)$_s$—O—, —(CH$_2$)$_r$—O—(CH$_2$)$_s$—CO—O— and —(CH$_2$)$_r$—O—(CH$_2$)$_s$—O—CO—, wherein R$^1$ is as defined herein above; r and s each represent an integer from 1 to 20; and r+s≦21. It is more preferred that r and s each represent an integer from 1 to 12. It is especially preferred that r+s≦15.

Examples of preferred groups S$_3$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy and the like.

Preferred monomer units from which the main chains of the side-chain polymers according to the invention are built up, are the imide groups of the general formulae IV, VI and VIII and/or the analogous amic acid groups and amic acid ester groups of the general formulae V, VII and IX:

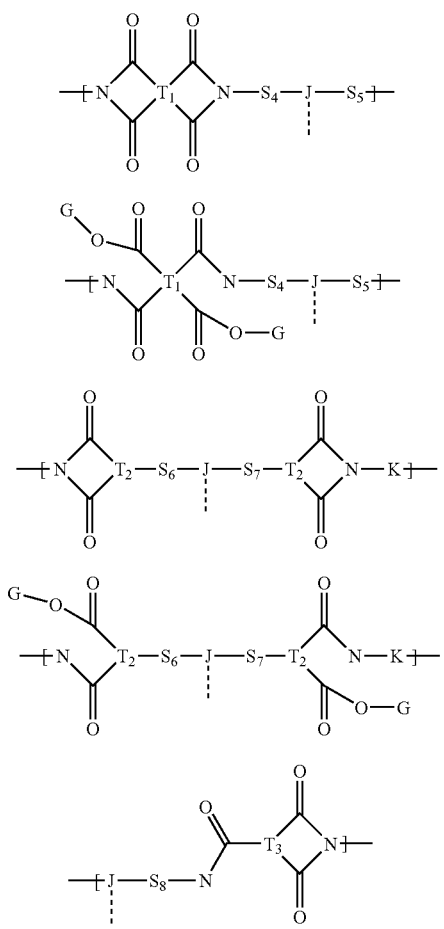

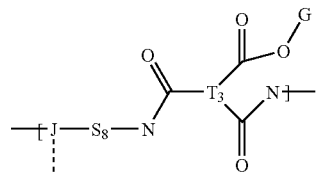

wherein:

the broken line symbolises the linkage to $S_1$;

$T_1$ represents a tetravalent organic radical;

$T_2$, $T_3$ each independently represent a trivalent aromatic or alicyclic group which is unsubstituted or substituted by from fluorine, chlorine, cyano or by a cyclic, straight-chain or branched alkyl residue which is unsubstituted mono- or poly-substituted by fluorine, chlorine, having 1 to 18 carbon atoms, wherein one or more non-adjacent —$CH_2$— groups may independently be replaced by a group selected from —O—, —CO—, —CO—O—, —O—CO—, —CH=CH— and —C≡C—;

$S_4$ to $S_8$ each independently of the other represent a single bond or a spacer unit such as a straight-chain or branched alkylene group which is unsubstituted, mono-substituted by fluorine, chlorine, cyano or poly-substituted by fluorine, chlorine, having 1 to 24 carbon atoms, wherein one or more non-adjacent —$CH_2$— groups may independently be replaced by a group B;

J is selected from the group comprising a nitrogen atom, a group —$CR^1$— and an aromatic or alicyclic divalent, trivalent or tetravalent group, which is unsubstituted, mono- or poly-substituted by from fluorine, chlorine, cyano or by a cyclic, straight-chain or branched alkyl residue which is unsubstituted, mono- or poly-substituted by fluorine, chlorine, having 1 to 18 carbon atoms, wherein one or more non-adjacent —$CH_2$— groups may independently be replaced by a group selected from —O—, —CO—, —CO—O—, —O—CO—, —CH=CH— and —C≡C—, wherein $R^1$ is as defined above;

K represents an aliphatic, alicyclic or aromatic divalent radical; and

G represents a hydrogen atom or a monovalent organic group.

By the term "aliphatic" it should be understood to include saturated and unsaturated, straight-chain and branched alkyl groups, which may be optionally substituted and in which one or more non-adjacent —$CH_2$— groups are replaced by one or more heteroatoms. Optional substituents include alkyl, aryl, cycloalkyl, amino, cyano, epoxy, halogen, hydroxy, nitro and oxo. Examples of heteroatoms that can replace the one or more —$CH_2$— groups include nitrogen, oxygen and sulfur. Replacement nitrogen atoms may be further substituted with groups such as alkyl, aryl and cycloalkyl.

The tetravalent organic radical $T_1$ is preferably derived from an aliphatic, alicyclic or aromatic tetracarboxylic acid dianhydride. Alicyclic or aliphatic tetracarboxylic acid anhydrides are preferably selected from 1,1,4,4-butanetetracarboxylic acid dianhydride, ethylenemaleic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxynorbornylacetic acid dianhydride, 2,3,4,5-tetrahydrofurantetracarboxylic acid dianhydride, rel-[1S,5R,6R]-3-oxabicyclo[3.2.1]octane-2,4-dione-6-spiro-3'-(tetrahydrofuran-2',5'-dione), 4-(2,5-dioxotetra-hydrofuran-3-yl)tetrahydronaphthalene-1,2-dicarboxylic acid dianhydride, 5-(2,5-dioxotetrahydrofuran-3-yl)-3-methyl--3-cyclohexene-1,2-dicarboxylic acid dianhydride, bicyclo[2.2.2]oct-7-ene-2,3,5,6-tetracarboxylic acid dianhydride, bicyclo[2.2.2]octane-2,3,5,6-tetracarboxylic acid dianhydride and 1,8-dimethylbicyclo[2.2.2]oct-7-ene-2,3,5,6-tetracarboxylic acid dianhydride.

Aromatic tetracarboxylic acid dianhydrides are preferably selected from pyromellitic acid dianhydride, 3,3',4,4'-benzophenonetetracarboxylic acid dianhydride, 4,4'-oxydiphthalic acid dianhydride, 3,3',4,4'-diphenylsulfonetetracarboxylic acid dianhydride, 1,4,5,8-naphthalenetetracarboxylic acid dianhydride, 2,3,6,7-naphthalenetetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-biphenyltetracarboxylic acid dianhydride, ethylene glycol bis(trimellitic acid) dianhydride, 4,4'-(1,4-phenylene) bis(phthalic acid)dianhydride, 4,4'-(1,3-phenylene)bis(phthalic acid)dianhydride, 4,4'-(hexafluoroisopropylidene) diphthalic acid dianhydride, 4,4'-oxydi(1,4-phenylene)bis (phthalic acid)dianhydride and 4,4'-methylenedi(1,4-phenylene)bis(phthalic acid)dianhydride.

It is especially preferred that the tetracarboxylic acid dianhydrides used to form the tetravalent organic radical $T_1$ are selected from 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 5-(2,5-dioxotetrahydrofuran-3-yl)-3-methyl-3-cyclohexene-1,2-dicarboxylic acid dianhydride, 4-(2,5-dioxotetrahydrofuran-3-yl) tetrahydronaphthalene-1,2-dicarboxylic acid dianhydride, 4,4'-(hexafluoroisopropylidene)diphthalic acid dianhydride and bicyclo-[2.2.2]oct-7-ene-2,3,5,6-tetracarboxylic acid dianhydride.

Each of the groups $T_2$ and $T_3$ can be derived from an aliphatic, alicyclic or aromatic dicarboxylic acid anhydride.

The groups $T_2$ and $T_3$ are preferably trivalent aromatic or alicyclic groups, the three valencies of which are distributed between three different carbon atoms, with the proviso that two of the valencies are located at adjacent carbon atoms. It is especially preferred that the groups $T_2$ and $T_3$ are trivalent benzene derivatives.

The group $S_4$ is preferably selected from a single covalent bond, $-(CH_2)_r-$, $-(CH_2)_r-O-$, $-(CH_2)_r-CO-$, $-(CH_2)_r-CO-O-$, $-(CH_2)_r-O-CO-$, $-(CH_2)_r-CO-NR^1-$, $-(CH_2)_r-NR^1-CO-$, $-(CH_2)_r-NR^1-$, $-(CH_2)_r-O-(CH_2)_s-$, $-(CH_2)_r-CO-O-(CH_2)_s-$, $-(CH_2)_r-O-CO-(CH_2)_s-$, $-(CH_2)_r-NR^1-CO-(CH_2)_s-$, $-(CH_2)_r-NR^1-CO-O-(CH_2)_s-$, $-(CH_2)_r-O-(CH_2)_s-O-$, $-(CH_2)_r-CO-O-(CH_2)_s-O-$, $-(CH_2)_r-O-CO-(CH_2)_s-O-$, $-(CH_2)_r-NR^1-CO-(CH_2)_s-O-$, $-(CH_2)_r-NR^1-CO-O-(CH_2)_s-O-$, $-(CH_2)_r-O-(CH_2)_s-CO-O-$ and $-(CH_2)_r-O-(CH_2)_s-O-CO-$, wherein $R^1$ is as defined herein above, r and s each represent an integer from 1 to 20, and $r+s \leq 21$. It is more preferred that r and s each represent an integer from 2 to 12. It is especially preferred that $r+s \leq 15$.

Examples of preferred groups $S_4$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyl, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy and the like.

The groups $S_5$ and $S_8$ are preferably selected from a single bond, $-(CH_2)_r-$, $-O-(CH_2)_r-$, $-CO-(CH_2)_r-$, $-CO-O-(CH_2)_r-$, $-O-CO-(CH_2)_r-$, $-NR^1-CO-(CH_2)_r-$, $-NR^1-(CH_2)_r-$, $-CO-NR^1-(CH_2)_r-$, $-NR^1-CO-(CH_2)_r-$, $-(CH_2)_r-O-(CH_2)_s-$, $-(CH_2)_r-CO-O-(CH_2)_s-$, $-(CH_2)_r-O-CO-(CH_2)_s-$, $-(CH_2)_r-NR^1-CO-(CH_2)_s-$, $-(CH_2)_r-NR^1-CO-O-(CH_2)_s-$, $-O-(CH_2)_r-O-(CH_2)_s-$, $-O-(CH_2)_r-CO-O-(CH_2)_s-$, $-O-(CH_2)_r-O-CO-(CH_2)_s-$, $-O-(CH_2)_r-NR^1-CO-(CH_2)_s-$, $-O-(CH_2)_r-NR^1-CO-O-(CH_2)_s-$, $-O-CO-(CH_2)_r-O-(CH_2)_s-$ and $-CO-O-(CH_2)_r-O-(CH_2)_s-$, wherein $R^1$ is defined as herein above, r and s each represent an integer from 1 to 20, and $r+s \leq 21$. It is more preferred that r and s each represent an integer from 2 to 12. It is further preferred that $r+s \leq 15$.

Examples of preferred groups $S_5$ and $S_8$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl) pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-

(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl) hexylene and the like.

The groups $S_6$ and $S_7$ are preferably selected from a single bond, $-(CH_2)_r-$, $-(CH_2)_r-O-$, $-(CH_2)_r-CO-$, $-(CH_2)_r-CO-O-$, $-(CH_2)_r-O-CO-$, $-(CH_2)_r-CO-NR^1-$, $-(CH_2)_r-NR^1-CO-$, $-(CH_2)_r-NR^1-$, $-O-(CH_2)_r-$, $-CO-O-(CH_2)_r-$, $-O-CO-(CH_2)_r-$, $-NR^1-CO-(CH_2)_r-$, $-CO-NR^1-(CH_2)_r-$, $-NR^1-(CH_2)_r-$, $-O-(CH_2)_r-CO-O-$, $-O-(CH_2)_r-O-CO-$, $-O-(CH_2)_r-CO-NR^1-$, $-O-(CH_2)_r-NR^1-$, $-O-(CH_2)_r-O-$, $-O-(CH_2)_r-NR^1-CO-$, $-NR^1-(CH_2)_r-CO-O-$, $-NR^1-(CH_2)_r-O-$, $-NR^1-(CH_2)_r-NR^1-$, $-NR^1-(CH_2)_r-O-CO-$, $-CO-NR^1-(CH_2)_r-O-$, $-CO-NR^1-(CH_2)_r-NR^1-$, $-CO-NR^1-(CH_2)_r-O-CO-$, $-O-CO-(CH_2)_r-CO-$, $-O-CO-(CH_2)_r-O-$, $-O-CO-(CH_2)_r-NR^1-$, $-O-CO-(CH_2)_r-CO-O-$, $-O-CO-(CH_2)_r-CO-NR^1-$, $-O-CO-(CH_2)_r-NR^1-CO-$, $-(CH_2)_r-O-(CH_2)_s-$, $-(CH_2)_r-CO-O-(CH_2)_s-$, $-(CH_2)_r-O-CO-(CH_2)_s-$, $-(CH_2)_r-NR^1-CO-(CH_2)_s-$, $-(CH_2)_r-NR^1-CO-O-(CH_2)_s-$, $-(CH_2)_r-O-(CH_2)_s-$, $-(CH_2)_r-CO-O-(CH_2)_s-O-$, $-(CH_2)_r-O-CO-(CH_2)_s-O-$, $-(CH_2)_r-NR^1-CO-(CH_2)_s-O-$, $-(CH_2)_r-NR^1CO-O-(CH_2)_s-O-$, $-O-(CH_2)_r-O-(CH_2)_s-$, $-O-(CH_2)_r-CO-O-(CH_2)_s-$, $-O-(CH_2)_r-NR^1-CO-(CH_2)_s-$, $-O-(CH_2)_r-NR^1-CO-O-(CH_2)_s-$, $-O-(CH_2)_r-CO-O-(CH_2)_s-O-$, $-O-(CH_2)_r-O-(CH_2)_s-O-$, $-O-(CH_2)_r-NR^1-CO-O-(CH_2)_s-O-$, $-CO-O-(CH_2)_r-O-(CH_2)_s-$, $-CO-O-(CH_2)_r-O-(CH_2)_s-O-$, wherein $R^1$ is defined as herein above; r and s each represent an integer from 1 to 20; and $r+s \leq 23$. It is more preferred that r and s each represent an integer from 2 to 12. It is especially preferred that $r+s \leq 15$.

Examples of preferred groups $S_6$ and $S_7$ include 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy and the like.

The aliphatic, alicyclic or aromatic divalent radical K is derivable from aliphatic, alicyclic or aromatic diamines by formal removal of the amino groups. Examples of aliphatic or alicyclic diamines from which the radical K can be derived include ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 1,11-undecylenediamine, 1,12-dodecylenediamine, α,α'-diamino-m-xylene, α,α'-diamino-p-xylene, (5-amino2,2,4-trimethylcyclopentyl)methylamine, 1,2-diaminocyclohexane, 4,4'-diaminodicyclohexylmethane, 1,3-bis(methylamino)cyclohexane and 4,9-dioxadodecane-1,12-diamine.

Examples of aromatic diamines from which the radical K can be derived include 3,5-diaminobenzoic acid methyl ester, 3,5-diaminobenzoic acid hexyl ester, 3,5-diaminobenzoic acid dodecyl ester, 3,5-diaminobenzoic acid isopropyl ester, 4,4'-methylenedianiline, 4,4'-ethylenedianiline, 4,4!-diamino-3,3'-dimethyldiphenylmethane, 3,3',5,5'-tetramethylbenzidine, 4,4'-diaminodiphenyl sulfone, 4,4'-diaminodiphenyl ether, 1,5-diaminonaphthalene, 3,3'-dimethyl-4,4'-diaminobiphenyl, 3,4'-diaminodiphenyl ether, 3,3'-diaminobenzophenone, 4,4'-diaminobenzophenone, 4,4'-diamino-2,2'-dimethylbibenzyl, bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 2,7-diaminofluorene, 9,9-bis(4-aminophenyl)fluorene, 4,4'-methylenebis(2-chloroaniline), 4,4'-bis(4-aminophenoxy)biphenyl, 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(1,4-phenyleneisopropylidene)bisaniline, 4,4'-(1,3-phenyleneisopropylidene)bisaniline, 2,2-bis[4-(4-aminophenoxy)phenyl]propane, 2,2-bis[3-(4-aminophenoxy)phenyl]hexafluoropropane, 2,2-bis(4-aminophenyl)hexafluoropropane, 2,2'-bis-[4-(4-amino-2-trifluoromethylphenoxy)phenyl]hexafluoropropane, 4,4'-diamino-2,2'-bis(trifluoromethyl)biphenyl, and 4,4'-bis[(4-amino-2-trifluoromethyl)phenoxy]-2,3,5,6,2',3',5',6'-octafluorobiphenyl.

The group J may be divalent, trivalent or tetravalent. When J is divalent, it serves to link the groups $S_4$ and $S_5$, $S_6$ and $S_7$ or $S_8$ and N respectively of the groups IV to IX. It will be appreciated that when J is a divalent group, the monomer unit of which it forms a part is not linked to a side chain group of formula Ia, Ib or combination of them. When J is a trivalent or a tetravalent group, it serves to link the monomer unit, of which it forms a part, to one or two side chain groups of formulae Ia, Ib or combination of them respectively. It is preferred that the photoactive polymer comprises less than 75% of monomer units including a divalent group J, preferably less than 50% and especially less than 30%. Monomer units comprising a trivalent group J are preferred.

The building blocks of the formulae V, VII and IX are amic acid groupings or amic acid ester groupings (i.e. carboxamide-carboxylic acid groupings or carboxamide-carboxylic acid ester groupings) which on the one hand may occur as a result of incomplete imidisation in the polyimide chain. On the other hand, polymers that consist only of building blocks of formulae V, VII or IX, that is to say polyamic acids or polyamic acid esters, are important precursors for the preparation of the polyimides according to the invention and are also included in the present invention. Of those polymers which contain groups of formulae V, VII or IX, preference is given to those in which G is hydrogen, that is to say those which consist exclusively of, or contain some, polyamic acid groups.

The polymers of the invention may be prepared using methods that are known to a person skilled in the art and a second aspect of the invention provides a method of preparing a compound as defined above.

Polyamic acids and polyimides of the present invention may be prepared in accordance with known methods, such as those described in *Plast. Eng.* 36 (1996) (Polyimides, fundamentals and applications).

For example, the polycondensation reaction for the preparation of the polyamic acids is carried out in solution in a polar aprotic organic solvent, such as γ-butyrolactone, N, N-dimethylacetamide, N-methylpyrrolidone or N, N-dimethylformamide. In most cases equimolar amounts of the dianhydride and the diamine are used, that is to say one amino group per anhydride group. If it is desired to stabilise the molecular weight of the polymer, it is possible for that purpose to add an excess or a less-than-stoichiometric amount of one of the two components or to add a monofunctional compound in the form of a dicarboxylic acid monoanhydride or in the form of a monoamine. Examples of such monofunctional compounds are maleic acid anhydride, phthalic acid anhydride, aniline and so on. The reaction is carried out preferably at a temperature of less than 100° C.

The cyclisation of the polyamic acids to form the polyimides can be carried out by heating, that is to say by condensation with removal of water or by other imidisation reactions with reagents. When carried out purely thermally, the imidisation of the polyamic acids is not always complete, that is to say the resulting polyimides may still contain proportions of polyamic acid. The imidisation reactions are generally carried out at a temperature of from 60 to 250° C., but preferably at less than 200° C. In order to achieve imidisation at rather lower temperatures there are additionally mixed into the reaction mixture reagents that facilitate the removal of water. Such reagents are, for example, mixtures consisting of acid anhydrides, such as acetic acid anhydride, propionic acid anhydride, phthalic acid anhydride, trifluoroacetic acid anhydride, and tertiary amines, such as triethylamine, trimethylamine, tributylamine, pyridine, N,N-dimethylaniline, lutidine, collidine etc. The amount of reagents used in that case is preferably at least two equivalents of amine and four equivalents of acid anhydride per equivalent of polyamic acid to be condensed.

The imidisation reaction can be carried out before or alternatively only after application to a support.

The polyamic acids and the polyimides of the present invention have an intrinsic viscosity preferably in range of 0.05 to 10 dL/g, more preferably 0.05 to 5 dL/g. Herein, the intrinsic viscosity ($\eta_{inh}=\ln \eta_{rel}/C$) is determined by measuring a solution containing a polymer in a concentration of 0.5 g/100 ml for its viscosity at 30° C. using N-methyl-2-pyrrolidone as solvent.

The polyamic acid chains or polyimide chains of the present invention preferably contain from 2 to 2000 monomer units, especially from 3 to 200.

Additives such as silane-containing compounds and epoxy-containing crosslinking agents may be added to the polymers of the invention in order to improve the adhesion of the polymer to a substrate. Suitable silane-containing compounds are described in *Plast. Eng.* 36 (1996) (Polyimides, fundamentals and applications). Suitable epoxy-containing crosslinking agents include 4,4'-methylenebis(N,N-diglycidylaniline), trimethylolpropane triglycidyl ether, benzene-1,2,4,5-tetracarboxylic acid 1,2:4,5-N,N'-diglycidyldiimide, polyethylene glycol diglycidyl ether, N,N-diglycidylcyclohexylamine and the like.

Further additives such as a photosensitiser, a photoradical generator and/or a cationic photoinitiator may also be added to the polymers of the invention. Suitable photoactive additives include 2,2-dimethoxyphenylethanone, a mixture of diphenylmethanone and N,N-dimethylbenzenamine or ethyl 4-(dimethylamino)benzoate, xanthone, thioxanthone, IRGACURE™ 184, 369, 500, 651 and 907 (Ciba), Michler's ketone, triaryl sulfonium salt and the like.

The polymers according to the invention may be used alone or in combination with other polymers, oligomers, monomers, photoactive polymers, photoactive oligomers and/or photoactive monomers, depending upon the application to which the polymer layer is to be put. It will therefore be appreciated that by varying the composition of the polymer layer it is possible to control properties such as an induced pretilt angle, good surface wetting, high voltage holding ratio, a specific anchoring energy etc.

Polymer layers may be readily prepared from the polymers of the present invention and a third aspect of the invention provides a polymer layer comprising a polymer according to the present invention in a crosslinked form. The polymer layer is preferably prepared by applying one or more polymers according to the invention to a support and, after any imidisation step which may be necessary, crosslinking the polymer or polymer mixture by irradiation with linearly polarised light. It is possible to vary the direction of orientation and the tilt angle within the polymer layer by controlling the direction of irradiation of the linearly polarised light. It will be appreciated that by selectively irradiating specific regions of the polymer layer it is possible to align very specific regions of the layer and provide layers with a defined angle of tilt. This orientation and tilt is retained in the polymer layer by the process of crosslinking.

It will be appreciated that the polymer layers of the present invention can also be used as orientation layers for liquid crystals and a preferred embodiment of the third aspect of the invention provides an orientation layer comprising one or more polymers according to the invention in a crosslinked form. Such orientation layers can be used in the manufacture of optical constructional elements, preferably in the production of hybrid layer elements.

The orientation layers are suitably prepared from a solution of the polymer material. The polymer solution is applied to a support optionally coated with an electrode (for example a glass plate coated with indium-tin oxide (ITO)) so that homogeneous layers of 0.05 to 50 μm thickness are produced. In this process different coating techniques like spincoating, miniscuscoating, wirecoating, slotcoating, offsetprinting, flexoprinting, gravurprinting may be used. Then, or optionally after prior imidisation, the regions to be oriented can be irradiated, for example, with a high-pressure mercury vapour lamp, a xenon lamp or a pulsed UV laser, using a polarizer and optionally a mask for creating images of structures. The irradiation time is dependent upon the output of the individual lamps and can vary from a few seconds to several hours. The dimerisation can also be carried out, however, by irradiation of the homogeneous layer using filters that, for example, allow only the radiation suitable for the crosslinking reaction to pass through.

It will be appreciated that the polymer layers of the invention may be used in the production of optical or electro-optical devices having at least one orientation layer as well as unstructured and structured optical elements and multi-layer systems.

A further embodiment of the third aspect of the invention provides an optical or electro-optical device comprising one or more polymers according to the first aspect of the invention in crosslinked form. The electro-optical devices may comprise more than one layer. The or each of the orientation layers may contain one or more regions of different spatial orientation.

The polymers in accordance with the invention are illustrated in more detail by the following Examples.

EXAMPLE 1

79.0 mg (0.403 mmol) of 1,2,3,4-cyclobutantetracarboxylic acid dianhydride was added to a solution of 850.0 mg (0.446 mmol) of 6-{[3,5-bis({3,5-bis[(8-{2-methoxy-4-[(1E)-3-methoxy-3-oxo-1-propenyl]phenoxy}octyl)oxy] benzyl}oxy)benzoyl]oxy}hexyl 3,5-diaminobenzoate in 1.40 ml of tetrahydrofurane. Stirring was then carried out at 0° C. for 2 hours. Then another 8.8 mg (0.045 mmol) of 1,2,3,4-cyclobutantetracarboxylic acid dianhydride were added. The mixture was subsequently allowed, to react for 22 hours at room temperature. The polymer mixture was diluted with 1.5 ml THF, precipitated into 100 ml diethyl ether and collected by filtration. The polymer was reprecipitated form THF (10 ml) into 200 ml water to yield, after drying at room temperature under vacuum, 0.76 g of Polyamic Acid 1 in the from of a beige powder; [η]=0.17 dL/g.

The 6-{[3,5-bis({3,5-bis[(8-{2-methoxy-4-[(1E)-3-methoxy-3-oxo-1-propenyl]phenoxy}octyl)oxy]benzyl}oxy) benzoyl]oxy}hexyl 3,5-diaminobenzoate used as starting material was prepared in accordance with the following procedure.

Preparation of methyl (2E)-3-{4-[(8-chloroctyl)oxy]-3-methoxyphenyl)}-2-propenoate 20.0 g (96.06 mmol) methyl (2E)-3-(4-hydroxy-3-methoxyphenyl)-2-propenoate, 16.6 g (100.9 mmol) 8-chlor-1-octanol and 27.7 g (105.7 mmol) of triphenylphosphine were dissolved in 400 ml of tetrahydrofurane. The colorless solution was subsequently cooled to 0° C. and 46.0 g (105.7 mmol) of a 40% solution of azodicarboxylic acid diethyl ester in toluene was added dropwise thereto over a period of 25 minutes. The mixture was subsequently allowed to react for 4 hours at 0° C. The reaction mixture reduced in volume by evaporation. The resulting residue was added to a mixture of methanol and water (3:2) and was then extracted with a mixture of tert.-butyl-methylether:hexane 1:1. The tert.-butyl-methylether:hexane phase was washed repeatedly with water, dried over magnesium sulfate, filtered and concentrated by rotary evaporation. The crude product was recrystallised from 2-propanol yielded 30.8 g (90%) methyl (2E)-3-{4-[(8-chloroctyl)oxy]-3-methoxyphenyl}-2-propenoate as white crystals.

Preparation of methyl (2E)-3-{4-[(8-iodoctyl)oxy]-3-methoxyphenyl}-2-propenoate 26.8 g (75.52 mmol) methyl (2E)-3-{4-[(8-chloroctyl) oxy]-3-methoxyphenyl}-2-propenoate was dissolved in 1000 ml acetone. 65.16 g (435.15 mmol) sodium iodide were added. The reaction suspension was heated at reflux temperature for 24 hours. The reaction mixture was partitioned between diethylether and water. The organic phase was washed repeatedly with water, dried over sodium sulfate, filtered and concentrated by rotary evaporation. The crude product was recrystallised from 2-propanol yielded 30.1 g (90%) methyl (2E)-3-{4-[(8-iodoctyl)oxy]-3-methoxyphenyl}-2-propenoate as white crystals.

Preparation of 3,5-bis[(8-{2-methoxy-4-[(1E)-3-methoxy-3-oxo-1-propenyl]phenoxy}octyl)oxy]benzyl alcohol 5.87 g (13.15 mmol) methyl (2E)-3-{4-[(8-iodoctyl)oxy]-3-methoxyphenyl}-2-propenoate, 0.872 g (6.26 mmol) 3,5-dihydroxybenzyl alcohol were dissolved in 50 ml N,N-dimethylformamide. 4.33 g (31.31 mmol) potassium carbonate were added. The reaction suspension was then heated at reflux temperature for 24 hours. The reaction mixture was partitioned between ethyl acetate and a saturated sodium chloride solution. The organic phase was washed repeatedly with water, dried over sodium sulfate, filtered and concentrated by rotary evaporation. Chromatography of the residue on 240 g silica gel using first toluene: ethyl acetate (4:1) then (7:3) yielded 2.15 g (42%) 3,5-bis [(8-{2-methoxy-4-[(1E)-3-methoxy-3-oxo-1-propenyl] phenoxy}-octyl)oxy]benzyl alcohol as colorless oil.

Preparation of 6-chlorhexyl 3,5-dihydroxybenzoate 1.541 g (10.0 mmol) 3,5-dihyroxybenzoic acid, 2.732 g (20.0 mmol) 6-chlor-1-hexanol were dissolved in 20 ml toluene, and 0.2 ml of concentrated sulfuric acid was added thereto. The reaction mixture was then heated at reflux temperature for 20 hours, and was partitioned between ethyl acetate and a saturated sodium bicarbonate solution. The organic phase was washed repeatedly with water, dried over sodium sulfate, filtered and concentrated by rotary evaporation. Chromatography of the residue on 120 g silica gel using cyclohexane:ethyl acetate (7:3) as eluant yielded 2.3 g (84%) of 6-chlorohexyl 3,5-dihydroxybenzoate as orange oil.

Preparation of 6-[(3,5-dinitrobenzoyl)oxy]hexyl 3,5-dihydroxybenzoate 1.960 g (9.2 mmol) 3,5-dinitrobenzoic acid was suspended in 10 ml N,N-dimethylformamide. 1.407 g (9.2 mmol) 1,8-diazabicyclo[5.4.0]undec-7-ene(1,5-5) (DBU) were added dropwise over a period of 10 minutes, and 0.708 g (1.9 mmol) tetrabutylammonium iodide were added. A solution of 2.3 g (8.2 mmol) 6-chlorohexyl 3,5-dihydroxybenzoate and 15 ml N,N-dimethylformamide were added and the resulting mixture was then heated to 84° C. for 22 hours. The reaction mixture was cooled and then partitioned between ethyl acetate and water. The organic phase was washed repeatedly with water, dried over sodium sulfate, filtered and concentrated by rotary evaporation. Chromatography of the residue on 110 g silica gel using first cyclohexane:ethyl acetate (7:3) then (3:2) as eluant yielded 2.3 g (56%) of 6-[(3,5-dinitrobenzoyl)oxy]hexyl 3,5-dihydroxybenzoate as yellow crystals.

Preparation of 6-[(3,5-dinitrobenzoyl)oxy]hexyl 3,5-bis({3, 5-bis[(8-{2-methoxy-4-[(1E)-3-methoxy-3-oxo-1-propenyl]phenoxy}octyl)oxy]benzyl}oxy}benzoate 0.488 g (1.09 mmol) of 6-[(3,5-dinitrobenzoyl)oxy]hexyl 3,5-dihydroxybenzoate, 0.601 g (2.29 mmol) triphenylphosphine were dissolved in 20 ml tetrahydrofurane. 1.694 g (2.18 mmol) 3,5-bis[(8-{2-methoxy-4-[(1E)-3-methoxy-3-oxo-1-propenyl]phenoxy}octyl)oxy]benzyl alcohol were added, the resulting suspension was heated of 40° C. After dissolution the reaction solution was cooled to 0° C. and 1.01 g (2.32 mmol) of a 40% solution of azodicarboxylic acid diethyl ester in toluene was added dropwise thereto over a period of 5 minutes. The mixture was subsequently allowed to react for 2 hours at 0° C. and 1 hours at 25° C. The reaction mixture was then partitioned between ethyl acetate and water. The organic phase was washed repeatedly with water, dried over sodium sulfate, filtered and concentrated by rotary evaporation. First chromatography of the residue on 120 g silica gel using toluene:ethyl acetate (9:1) as eluant and second chromatography on 40 g LiChroprep RP-18 using Acetonitrile:tetrahydrofurane (9:1) as eluant yielded 1.50 g (67.0%) of 6-[(3,5-dinitrobenzoyl)oxy]hexyl 3,5-bis({3,5-bis[(8-{2-methoxy-4-[(1E)-3-methoxy-3-oxo-1-propenyl]phenoxy}octyl)oxy]benzyl}oxy}benzoate as colorless oil.

Preparation of 6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyl 3,5-diaminobenzoate 1.436 g (0.73 mmol) 6-[(3,5-dinitrobenzoyl)oxy]hexyl 3,5-bis({3,5-bis[(8-{2-methoxy-4-[(1E)-3-methoxy-3-oxo-1-propenyl]phenoxy}octyl)oxy]benzyl}oxy}benzoate were dissolved in a mixture of 10.5 ml N,N-dimethylformamide and 0.8 ml water. 1.188 g (4.40 mmol) Ferric chloride hexahydrate and 0.716 g (10.95 mmol) Zinc powder were added, the temperature rise to 43° C. The mixture was allowed to react for 2 hours. The reaction mixture was then partitioned between ethyl acetate and water and filtered. The organic phase was washed repeatedly with water, dried over sodium sulfate, filtered and concentrated by rotary evaporation. Chromatography of the residue on 55 g silica gel using dichloromethane:acetone (9:1) as eluant yielded 0.87 g (62%) of 6-{[3,5-bis({3,5-bis[(8-{2-methoxy-4-[(1E)-3-methoxy-3-oxo-1-propenyl]phenoxy}octyl)oxy]benzyl}-oxy)benzoyl]oxy}hexyl 3,5-diaminobenzoate as brown oil.

The following diamines can be synthesized in a analogous manner:

6-{[3,5-bis({3,5-bis[(6-{2-methoxy-4-[(1E)-3-methoxy-3-oxo-1-propenyl]phenoxy}hexyl)oxy]benzyl}oxy)benzoyl]oxy}hexyl 3,5-diaminobenzoate;

6-{[3,5-bis({3, 4,-tris[(6-{2-methoxy-4-[(1E)-3-methoxy-3-oxo-1-propenyl]phenoxy}hexyl)oxy]benzyl}oxy)benzoyl]oxy}hexyl 3,5-diaminobenzoate;

6-{[3,5-bis({3,5-bis[(6-{2-methoxy-4-[(1E)-3-(pentyloxy)-3-oxo-1-propenyl]phenoxy}hexyl)oxy]benzyl}oxy)benzoyl]oxy}hexyl 3,5-diaminobenzoate;

6-{[3,5-bis({3,5-bis[(6-{2-methoxy-4-[(1E)-3-[(2-ethylpentyl)oxy]-3-oxo-1-propenyl]phenoxy}hexyl)oxy]benzyl}-oxy)benzoyl]oxy}hexyl 3,5-diaminobenzoate;

6-{[3,5-bis({3,5-bis[(11-{2-methoxy-4-[(1E)-3-methoxy-3-oxo-1-propenyl]phenoxy}undecyl)oxy]benzyl}oxy)benzoyl]oxy}hexyl 3,5-diaminobenzoate;

6-{[3,5-bis({3,5-bis[(11-{2-methoxy-4-[(1E)-3-methoxy-3-oxo-1-propenyl-]phenoxy}undecyl)oxy]benzyl}oxy)benzoyl]oxy}hexyl 3,5-diaminobenzoate;

6-{[3,5-bis({3,4-bis[(6-{2-methoxy-4-[(1E)-3-methoxy-3-oxo-1-propenyl]phenoxy}hexyl)oxy]benzyl}oxy)benzoyl]oxy}hexyl 3,5-diaminobenzoate;

6-{[3,5-bis({3,5-bis[(8-{2-methoxy-4-[(1E)-3-hexyloxy-3-oxo-1-propenyl]phenoxy}octyl)oxy]benzyl}oxy)benzoyl]oxy}hexyl 3,5-diaminobenzoate;

11-{[3,5-bis({3,5-bis[(6-{2-methoxy-4-[(1E)-3-methoxy-3-oxo-1-propenyl]phenoxy}hexyl)oxy]benzyl}oxy)benzoyl]oxy}undecyl 3,5-diaminobenzoate;

2-{[3,5-bis({3,5-bis[(6-{2-methoxy-4-[(1E)-3-methoxy-3-oxo-1-propenyl]phenoxy}hexyl)oxy]benzyl}oxy)benzoyl]oxy}ethyl 3,5-diaminobenzoate;

6-{[3,5-bis({3,5-bis[(6-{4-[(1E)-3-methoxy-3-oxo-1-propenyl]phenoxy}hexyl)oxy]benzyl}oxy)benzoyl]oxy}hexyl 3,5-diaminobenzoate;

6-{[3,5-bis({3,5-bis[(6-{2-(cyclohexylmethoxy)-4-[(1E)-3-methoxy-3-oxo-1-propenyl]phenoxy}hexyl)oxy]benzyl}oxy)benzoyl]oxy}hexyl 3,5-diaminobenzoate;

6-{[3,5-bis({3,5-bis[(6-{2-methoxy-4-[(1E)-3-(pentyloxy)-3-oxo-1-propenyl]phenoxy}hexyl)oxy]benzyl}oxy)benzoyl]oxy}hexyl 3,5-diaminobenzoate;

6-{[3,5-bis({3,5-bis[(6-[({4-[(1E)-3-methoxy-3-oxo-1-propenyl]benzoyl}oxy)hexyl]oxy]benzyl}oxy)benzoyl]oxy}hexyl 3,5-diaminobenzoate;

4-(2,5-diaminophenoxy)butyl 3,5-bis{[3,5-bis(4-{4-[(1E)-3-methoxy-3-oxo-1-propenyl]phenoxy}butoxy)benzyl]oxy}benzoate;

2,2'-bis({[3,5-bis{[3,5-bis(4-{4-[(1E)-3-methoxy-3-oxo-1-propenyl]phenoxy}butoxy)benzyl]oxy}benzoyl]oxy}hexyloxy)-1,1'-biphenyl-4,4'-diamine.

EXAMPLE 2

0.50 g of Polyamic Acid 1 obtained in Example 1 were dissolved in 3 ml of tetrahydrofurane. Thereto were added 73 mg (0.92 mmol) of pyridine and 94 mg (0.92 mmol) acetic acid anhydride, and the dehydration and ring closure was carried out at reflux temperature for 2 hours. The polymer mixture was diluted with 1.5 ml THF, precipitated into 100 ml diethyl ether and collected by filtration. The polymer was reprecipitated form THF (10 ml) into 200 ml water to yield, after drying at room temperature under vacuum, to yield Polyimide 1.

EXAMPLE 3

Preparation can be carried out analogously to Example 1 using 138.3 mg (0.446 mmol) of 4,4'-oxydiphtalic anhydride and 850.0 mg (0.446 mmol) of 6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyl 3,5-diaminobenzoate, to yield Polyamic Acid 2.

EXAMPLE 4

Preparation can be carried out analogously to Example 1 using 133.9 mg (0.446 mmol) of 4-(2,5-Dioxotetrahydrofuran-3-yl)-tetralin-1,2-dicarboxylic anhydride and 850.0 mg (0.446 mmol) of 6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyl 3,5-diaminobenzoate, to yield Polyamic Acid 3.

EXAMPLE 5

Preparation can be carried out analogously to Example 1 using 87.8 mg (0.446 mmol) of 1,2,3,4-cyclobutantetracarboxylic acid anhydride, 74.5 mg (0.223 mmol) 2,2-bis(4-aminophenyl)hexafluoropropane and 425.0 mg (O.223 mmol) of 6-{[3,5-bis({3,5-bis[(8-{2-methoxy-4-[(1E)-3-methoxy-3-oxo-1-propenyl]phenoxy}octyl)oxy]benzyl}oxy)benzoyl]oxy}hexyl 3,5-diaminobenzoate, to yield Polyamic Acid 4.

EXAMPLE 6

Preparation can be carried out analogously to Example 1 using 427 mg (0.3112 mmol) 6-{[3,5-bis({-2,2-bis[({4-[(1E)-3-methoxy-3-oxo-1-propenyl]benzoyl}oxy)methyl]propanoyl}oxy)benzoyl]oxy}hexyl 3,5-diaminobenzoate and 61 mg (0.3112 mmol) 1,2,3,4-cyclobutantetracarboxylic acid dianhydride, to yield 325 mg Polyamic Acid 5; [η]=0.19 dL/g.

The 6-{[3,5-bis({-2,2-bis[({4-[(1E)-3-methoxy-3-oxo-1-propenyl]benzoyl}oxy)methyl]propanoyl}oxy)benzoyl]oxy}hexyl 3,5-diaminobenzoate used as starting material was prepared in accordance with the following procedure.

Preparation of 6-({3,5-bis{[(2,2,5-trimethyl-1,3-dioxan-5-yl)carbonyl]oxy}benzoyl}oxy)hexyl 3,5-dinitrobenzoate A mixture of 0.657 g (3.77 mmol) 2,2,5-trimethyl-1,3-dioxane-5-carboxylic acid, 0.810 g (1.81 mmol) 6-[(3,5-dinitrobenzoyl)oxy]hexyl 3,5-dihydroxybenzoate, 0.21 g (0.72 mmol) 4-(dimethylamino)pyridinium p-toluenesulfonate in 15 ml dichloromethane was cooled to 0° C. and 0.93 g (4.52 mmol) N,N'-dicyclohexylcarbodiimide were added. The mixture was subsequently allowed to react for 24 hours at 25° C. and filtered. The filtrate was concentrated by evaporation. Chromatography of the residue on 150 g silica gel using first cyclohexane:ethyl acetate (7:3) then (3:2) as eluant yielded 1.38 g 6-({3,5-bis[(2,2,5-trimethyl-1,3-dioxan-5-yl)methoxy]-benzoyl}oxy)hexyl 3,5-dinitrobenzoate as colorless oil.

Preparation of 6-[(3,5-dinitrobenzoyl)oxy]hexyl 3,5-bis{[2,2-bis(hydroxymethyl)propanoyl]oxy}benzoate 1.38 g (1.81 mmol) 6-({3,5-bis{[(2,2,5-trimethyl-1,3-dioxan-5-yl)carbonyl]oxy}benzoyl}oxy)hexyl 3,5-dinitrobenzoate was dissolved in 20 ml methanol. 0.50 g of Dowex 50Wx2 resin and the reaction mixture was stirred for 4 hours at room temperature. The Dowex resin was filtered off and washed with methanol. The filtrate was concentrated by rotary evaporation yielded 1.14 g (92%) 6-[(3,5-dinitrobenzoyl)oxy]hexyl 3,5-bis{[2,2-bis(hydroxymethyl)propanoyl]oxy}benzoate as a colorless viscous oil.

Preparation of 6-[(3,5-dinitrobenzoyl)oxy]hexyl 3,5-bis{[2,2-bis[({4-[(1E)-3-methoxy-3-oxo-1-propenyl]benzoyl}oxy)methyl]propanolyl]oxy}benzoate 1.14 g (1.67 mmol) 6-[(3,5-dinitrobenzoyl)oxy]hexyl 3,5-bis{[2,2-bis(hydroxymethyl)propanoyl]oxy}benzoate, 1.45g (7.03 mmol) 4-[(1E)-3-methoxy-3-oxo-1-propenyl]benzoic acid, 0.39 g (1.34 mmol) 4-(dimethylamino)pyridinium p-toluenesulfonate in 40 ml dichloromethane was cooled to 0° C. and 1.73 g (8.37 mmol) N,N'-dicyclohexylcarbodiimide were added. The mixture was subsequently allowed to react for 24 hours at 25° C. and filtered. The filtrate was concentrated by evaporation. Chromatography of the residue on 150 g silica gel using first cyclohexane:ethyl acetate (7:3) then (3:2) as eluant yielded 2.09 g (87%) 6-[(3,5-dinitrobenzoyl)oxy]hexyl 3,5-bis{[2,2-bis[({4-[(1E)-3-methoxy-3-oxo-1-propenyl]benzoyl}oxy)methyl]propanoyl]oxy}benzoate.

Preparation of 6-{[3,5-bis({2,2-bis[({4-[(1E)-3-methoxy-3-oxo-1-propenyl]benzoyl}oxy)methyl]propanoyl}oxy)benzoyl]oxy}hexyl 3,5-diaminobenzoate Preparation can be carried out analogously to Example 1 using 1.00 g (0.698 mmol) 6-[(3,5-dinitrobenzoyl)oxy]hexyl 3,5-bis{[2,2-bis[({4-[(1E)-3-methoxy-3-oxo-1-propenyl]benzoyl}oxy)methyl]propanoyl]oxy}benzoate, 1.13 g (4.18 mmol) Ferric chloride hexahydrate and 0.457 g (6.98 mmol) Zinc powder, to yield 1.25 g (91%) 6-{[3,5-bis({2,2-bis[({4-[(1E)-3-methoxy-3-oxo-1-propenyl]benzoyl}oxy)methyl]propanoyl}oxy)benzoyl]oxy}hexyl 3,5-diaminobenzoate.

The following diamines can be synthesized in a analogous manner:

8-{[3,5-bis({2,2-bis[({4-[(1E)-3-methoxy-3-oxo-1-propenyl]benzoyl}oxy)methyl]propanoyl}oxy)benzoyl]oxy}octyl 3,5-diaminobenzoate;

11-{[3,5-bis({2,2-bis[({4-[(1E)-3-methoxy-3-oxo-1-propenyl]benzoyl}oxy)methyl]propanoyl}oxy)benzoyl]oxy}undecyl 3,5-diaminobenzoate;

6-{[3,4-bis({2,2-bis[({4-[(1E)-3-methoxy-3-oxo-1-propenyl]benzoyl}oxy)methyl]propanoyl}oxy)benzoyl]oxy}hexyl 3,5-diaminobenzoate;

6-{[2,4-bis({2,2-bis[({4-[(1E)-3-methoxy-3-oxo-1-propenyl]benzoyl}oxy)methyl]propanoyl}oxy)benzoyl]oxy}hexyl 3,5-diaminobenzoate;

6-{[3,5-bis({2,2-bis[({4-[(1E)-3-hexyloxy-3-oxo-1-propenyl]benzoyl}oxy)methyl]propanoyl}oxy)benzoyl]oxy}hexyl 3,5-diaminobenzoate;

6-{[3,5-bis({2,2-bis[({4-[(1E)-3-methoxy-3-oxo-1-propenyl]benzoyl}oxy)methyl]butanoyl}oxy)benzoyl]oxy}hexyl 3,5-diaminobenzoate;

6-{[3,5-bis{[(2,2-bis[[(6-{4-[(1E)-3-methoxy-3-oxo-1-propenyl]phenoxy}hexyloyl)oxy]methyl}propanoyl}oxy)benzoyl]oxy}hexyl 3,5-diaminobenzoate;

8-{[3,5-bis({2,2-bis[({4-[(1E)-3-[(2-ethylpentyl)oxy]-3-oxo-1-propenyl]benzoyl}oxy)methyl]propanoyl}oxy)benzoyl]oxy}octyl 3,5-diaminobenzoate;

6-(2,5-diamino)hexyl 3,5-bis({2,2-bis[({4-[(1E)-3-methoxy-3-oxo-1-propenyl]benzoyl}oxy)methyl]propanoyl}oxy)benzoyl]oxy}benzoate.

EXAMPLE 7

Preparation can be carried out analogously to Example 1 using 141.8 mg (0.723 mmol) of 1,2,3,4-cyclobutantetracarboxylic acid dianhydride, 425.0 mg (0.223 mmol) of 6-{[3,5-bis([3,5-bis[(8-{2-methoxy-4-[(1E)-3-methoxy-3-oxo-1-propenyl]phenoxy}octyl)oxy]benzyl}oxy)benzoyl]oxy}hexyl 3,5-diaminobenzoate and 0.686 g (0.500 mmol) 6-{[3,5-bis({3-({4-[4-(1E)-3-methoxy-3-oxo-1-propenyl]benzoyl}oxy)-2-[({4-[4-(1E)-3-methoxy-3-oxo-1-propenyl]benzoyl}oxy)methyl]-2-methylpropanoyl}oxy)benzoyl]oxy}hexyl 3,5-diaminobenzoate, to yield Polyamic Acid 6.

EXAMPLE 8

Preparation can be carried out analogously to Example 1 using 79.0 mg (0.403 mmol) of 1,2,3,4-cyclobutantetracarboxylic acid dianhydride and 11-[(3,5-bis[(3,5-bis[(3,5-bis[(6-{[(2E)-3-(4-butoxy-3-methoxyphenyl)-2-propenoyl]oxy}hexyl)oxy]benzyl)oxy]benzyl)oxy]benzoyl)oxy]undecyl 3,5-diaminobenzoate, to yield Polyamic Acid 7.

The 11-[(3,5-bis[(3,5-bis[(3,5-bis{[(6-[(2E)-3-(4-butoxy-3-methoxyphenyl)-2-propenoyl]oxy}hexyl)oxy]benzyl)oxy]benzyl)oxy]benzoyl)oxy]undecyl 3,5-diaminobenzoate used as starting material was prepared in accordance with the following procedure.

Preparation of methyl (2E)-3-(4-butoxy-3-methoxyphenyl)-2-propenoate 4.16 g (20.0 mmol) ferulic acid methyl ester was dissolved in 115 ml 2-butanone. 2.09 ml (22.0 mmol) n-butyl bromide and 11.06 g (80 mmol) potassium carbonate were added. The reaction suspension was then heated at reflux temperature for 20 hours. The reaction mixture was filtered. The filtrate was concentrated by evaporation. The crude product was recrystallised from 42 ml isopropyl alcohol and yielded 4.85 g (92%) methyl (2E)-3-(4-butoxy-3-methoxyphenyl)-2-propenoate as white crystals.

Preparation of (2E)-3-(4-butoxy-3-methoxyphenyl)-2-propenoic acid 10 g (0.15 mol) potassium hydroxide were dissolved in a mixture of 200 ml methyl alcohol and 5 ml water. 4.85 g (18.35 mmol) methyl (2E)-3-(4-butoxy-3-methoxyphenyl)-2-propenoate was added. The reaction mixture was subsequently heated to 60° C. After 2.5 h the mixture was concentrated by evaporation. The residue was dissolved in 100 ml cold water and acidified to pH=1 with 13.5 ml hydrochloric acid 37 wt. %. The product was filtered off, washed with water and dried at 50° C. under vacuum to give 4.24 g (92%) (2E)-3-(4-butoxy-3-methoxyphenyl)-2-propenoic acid as white crystals.

Preparation of 6-chlorohexyl (2E)-3-(4-butoxy-3-methoxyphenyl)-2-propenoate

Preparation was carried out analogously to Example 5 using 4.24 g (16.94 mmol) (2E)-3-(4-butoxy-3-methoxyphenyl)-2-propenoic acid, 2.20 g (16.13 mmol) 6-chloro-1-hexanol, 1.90 g (6.45 mmol) 4-(dimethylamino)pyridinium p-toluenesulfonate and 4.16 g (20.17 mmol) N,N'-dicyclohexylcarbodiimide to give 6-chlorohexyl (2E)-3-(4-butoxy-3-methoxyphenyl)-2-propenoate as colorless oil.

Preparation of 6-iodohexyl (2E)-3-(4-butoxy-3-methoxyphenyl)-2-propenoate

Preparation can be carried out analogously to Example 1 using 4.00 g (10.84 mmol) 6-chlorohexyl (2E)-3-(4-butoxy-3-methoxyphenyl)-2-propenoate and 9.75 g (65.05 mmol) sodium iodide, to yield 6-iodohexyl (2E)-3-(4-butoxy-3-methoxyphenyl)-2-propenoate.

Preparation of 3,5-bis[(6-{[(2E)-3-(4-butoxy-3-methoxyphenyl)-2-propenoyl]oxy}hexyl)oxy]benzyl alcohol Preparation can be carried out analogously to Example 1 using 4.60 g (10.0 mmol) 6-iodohexyl (2E)-3-(4-butoxy-3-methoxyphenyl)-2-propenoate, 0.667 g (4.76 mmol) 3,5-dihydroxybenzyl and 3.27 g (23.6 mmol) potassium carbonate, to yield 3,5-bis[(6-{[(2E)-3-(4-butoxy-3-methoxyphenyl)-2-propenoyl]oxy}hexyl)oxy]benzyl alcohol.

Preparation of 3,5-bis[(6-{[(2E)-3-(4-butoxy-3-methoxyphenyl)-2-propenoyl]oxy}hexyl)oxy]benzyl bromide 5.00 g (5.88 mmol) 3,5-bis[(6-{[(2E)-3-(4-butoxy-3-methoxyphenyl)-2-propenoyl]oxy}hexyl)oxy]benzyl alcohol, (6.47 mmol) tetrabromomethane were dissolved in 100 ml dichloromethane. The solution was subsequently cooled to 0° C. and a solution of 1.85 g (7.05 mmol) triphenylphosphine in 20 ml dichloromethane was added dropwise thereto over a period of 1 hour. The reaction mixture was reduced in volume by evaporation. Chromatography of the residue yield 3,5-bis[(6-{[(2E)-3-(4-butoxy-3-methoxy-phenyl)-2-propenoyl]oxy}hexyl)oxy]benzyl bromide.

Preparation of 3,5-bis({3,5-bis[(6-{[(2E)-3-(4-butoxy-3-methoxyphenyl)-2-propenoyl]oxy}hexyl)oxy]benzyl}oxy)benzyl alcohol Preparation can be carried out analogously to Example 1 using 4.34 g (5.00 mmol) 3,5-bis[(6-{[(2E)-3-(4-butoxy-3-methoxyphenyl)-2-propenoyl]oxy}hexyl)oxy]benzyl bromide, 0.334 g (2.38 mmol) 3,5-dihydroxybenzyl, 13 mg (0.05 mmol) 18-Crown-6 and 0.97 g (7.00 mmol) potassium carbonate to yield 3,5-bis({3,5-bis[(6-{[(2E)-3-(4-butoxy-3-methoxyphenyl)-2-propenoyl]oxy}hexyl)oxy]benzyl}oxy)benzyl alcohol.

Preparation of 11-[(3,5-dinitrobenzoyl)oxy]undecyl 3,5-bis({3,5-bis({3,5-bis[(6-{[(2E)-3-(4-butoxy-3-methoxyphenyl)-2-propenoyl]oxy}hexyl)oxy]benzyl}oxy)benzyl}oxy)benzoate Preparation can be carried out analogously to Example 1 using 0.488 g (1.09 mmol) of 11-[(3,5-dinitrobenzoyl)oxy]undecyl 3,5-dihydroxybenzoate, 0.601 g (2.29 mmol) triphenylphosphine, 3.74 g (2.18 mol) 3,5-bis({3,5-bis{[(6-[(2E)-3-(4-butoxy-3-methoxyphenyl)-2-propenoyl]oxy}hexyl)oxy]benzyl}oxy)benzyl alcohol and 1.01 g (2.32 mmol) of a 40% solution of azodicarboxylic acid diethyl ester in toluene, to yield 11-[(3,5-dinitrobenzoyl)oxy]undecyl 3,5-bis({3,5-bis({3,5-bis[(6-{[(2E)-3-(4-butoxy-3-methoxy-phenyl)-2-propenoyl]oxy}hexyl)oxy]benzyl}oxy)benzyl}oxy)benzoate.

Preparation of 11-[(3,5-bis[(3,5-bis[(3,5-bis[(6-{[(2E)-3-(4-butoxy-3-methoxyphenyl)-2-propenoyl]oxy}hexyl)oxy]benzyl)oxy]benzyl)oxy]benzoyl)oxy]undecyl 3,5-diaminobenzoate Preparation can be carried out analogously to Example 1 using 3.88 g (1.00 mmol) 6-[(3,5-dinitrobenzoyl)oxy]hexyl 3,5-bis({3,5-bis({3,5-bis[(6-{[(2E)-3-(4-butoxy-3-methoxy-phenyl)-2-propenoyl]oxy}hexyl)oxy]benzyl}oxy)benzyl}oxy)benzoate, 1.62 g (6.00 mmol) Ferric chloride hexahydrate and 0.654 g (10.00 mmol) Zinc powder to give 11-[(3,5-bis[(3,5-bis[(3,5-bis[(6-{[(2E)-3-(4-butoxy-3-methoxy-phenyl)-2-propenoyl]oxy}hexyl)oxy]benzyl)oxy]benzyl)oxy]benzoyl)oxy]undecyl 3,5-diaminobenzoate.

The following diamines can be synthesized in a analogous manner:

11-[(3,5-bis[(3,5-bis[(3,5-bis{[(6-{[(2E)-3-(4-butoxy-3-methoxyphenyl)-2-propenoyl]oxy}hexyl)oxy] carbonyl}benzyl)oxy]benzyl)oxy]benzoyl)oxy]undecyl 3,5-diaminobenzoate;

11-[(3,5-bis[(3,5-bis[(3,5-bis{[(6-{[(2E)-3-(4-butyl-3-methoxyphenyl)-2-propenoyl]oxy}hexyl)oxy]benzyl)oxy]benzyl)oxy]benzoyl)oxy]undecyl 3,5-diaminobenzoate;

11-[(3,5-bis[(3,5-bis[(3,5-bis[(6-{[(2E)-3-(4-pentylphenyl)-2-propenoyl]oxy}hexyl)oxy]benzyl)oxy]benzyl)oxy]benzoyl)oxy]undecyl 3,5-diaminobenzoate;

11-[(3,5-bis[(3,5-bis[(3,5-bis[(4-{[(2E)-3-(4-butoxy-3-methoxyphenyl)-2-propenoyl]oxy}butyl)oxy]benzyl)oxy]benzyl)oxy]benzoyl)oxy]undecyl 3,5-diaminobenzoate;

11-[(3,5-bis[(3,5-bis[(3,4-bis[(6-{[(2E)-3-(4-butoxy-3-methoxyphenyl)-2-propenoyl]oxy}hexyl)oxy]benzyl)oxy]benzyl)oxy]benzoyl)oxy]undecyl 3,5-diaminobenzoate;

11-[(3,5-bis[(3,5-bis[(3,4,5-tris[(11-{[(2E)-3-(4-butoxy-3-methoxyphenyl)-2-propenoyl]oxy}undecyl)oxy]benzyl)oxy]benzyl)oxy]benzoyl)oxy]undecyl 3,5-diaminobenzoate;

11-[(3,5-bis[(3,5-bis[(3,5-bis[(6-{[(2E)-3-{4-[(4-propylcyclohexyl)methoxy]phenyl}-2-propenoyl]oxy}hexyl)oxy]benzyl)oxy]benzyl)oxy]benzoyl)oxy]undecyl 3,5-diaminobenzoate;

11-[(3,5-bis[(3,5-bis[(3,5-bis[(6-{[(2E)-3-{4-[(2-ethyl-hexyl)oxy]phenyl)-2-propenoyl]oxy}hexyl)oxy]benzyl)oxy]benzyl)oxy]benzoyl)oxy]undecyl 3,5-diaminobenzoate;

11-[(3,5-bis[(3,5-bis[(3,5-bis[(6-{[(2E)-3-(4-butoxy-3-methoxyphenyl)-2-propenoyl]oxy}hexyl)oxy]benzyl)oxy]benzyl)oxy]benzoyl)oxy]undecyl 3,5-diaminobenzoate;

8-(2,5-diaminophenoxy)octyl 3,5-bis[(3,5-bis[(3,5-bis[(6-{[(2E)-3-(4-butoxy-3-methoxyphenyl)-2-propenoyl]oxy}hexyl)oxy]benzyl)oxy]benzyl)oxy]benzoate.

EXAMPLE 9

Preparation can be carried out analogously to Example 1 using 1.320 g (0.500 mmol) 11-{2,2-bis[({2,2-bis[({2,2-bis[({4-[(1E)-3-methoxy-3-oxo-1-propenyl]benzoyl}oxy)methyl]propanoyl}oxy)methyl]propanoyl}oxy)methyl]propanoyl}undecyl 3,5-diaminobenzoate and 98.1 mg (0.500 mmol) 1,2,3,4-cyclobutanetetracarboxylic acid dianhydride, to yield Polyamic Acid 8.

The 11-{2,2-bis[({2,2-bis[({2,2-bis[({4-[(1E)-3-methoxy-3-oxo-1-propenyl]benzoyl}oxy)methyl]propanoyl}oxy)methyl]propanoyl}oxy)methyl]propanoyl}undecyl 3,5-diaminobenzoate used as starting material can be prepared in accordance with the following procedure.

Preparation of 11-bromomoundecyl 3,5-dinitrobenzoate 11.4 g (45.4 mmol) 11-bromo-1-undecanol, 11.0 g (47.7 mmol) 3,5-dinitrobenzoyl chloride, 54 mg 4-dimethylaminopyridine were dissolved in 94 ml dichloromethane. The solution was subsequently cooled to 0° C. and then 18.3 ml (227 mmol) pyridine was added dropwise, in the course of 25 minutes. After 4.5 hours at 0° C. the reaction mixture was partitioned between dichloromethane and water; the organic phase was washed repeatedly with water, dried over sodium sulfate, filtered and concentrated by rotary evaporation. Chromatography of the residue on 200 g silica gel using Toluene yielded 18.1 g (90%) 11-bromoundecyl 3,5-dinitrobenzoate as yellow powder.

Preparation of 11-[(3,5-dinitrobenzoyl)oxy]undecyl 2,2-bis[({2,2-bis[({(2,2,5-trimethyl-1,3-dioxan-5-yl)carbonyl}oxy)methyl]propanoyl}oxy)methyl]propanoate Preparation can be carried out analogously to Example 1 using 10.19 g (9.81 mmol) 2,2-bis[({2,2-bis[({(2,2,5-trimethyl-1,3-dioxan-5-yl)carbonyl}oxy)methyl]propanoyl}oxy)methyl]propanoic acid, 1.494 g (9.81 mmol) 1,8-diazabicyclo[5.4.0]undec-7-ene(1,5-5) (DBU) and 4.81 g (10.79 mmol) 11-bromoundecyl 3,5-dinitrobenzoate, to yield 11-[(3,5-dinitrobenzoyl)oxy]undecyl 2,2-bis[({2,2-bis[({(2,2,5-trimethyl-1,3-dioxan-5-yl)carbonyl}oxy)methyl]propanoyl}oxy)methyl]propanoate.

Preparation of 11-[(3,5-dinitrobenzoyl)oxy]undecyl 2,2-bis{([2,2-bis{([2,2-bis(hydroxymethyl)propanoyl]oxy)methyl]propanoyl]oxy)methyl}propanoate Preparation can be carried out analogously to Example 6 using 6.92 g (5.00 mmol) 11-[(3,5-dinitrobenzoyl)oxy]undecyl 2,2-bis{([2,2-bis{([(2,2,5-trimethyl-1,3-dioxan-5-yl)carbonyl]oxy)methyl]propanoyl]oxy)methyl}propanoate and 2.5 g Dowex 50Wx2 resin, to yield 11-[(3,5-dinitrobenzoyl)oxy]undecyl 2,2-bis{([2,2-bis{([2,2-bis(hydroxymethyl)propanoyl]oxy)methyl]propanoyl]oxy)methyl}propanoate.

Preparation of 11-[(3,5-dinitrobenzoyl)oxy]undecyl 2,2-bis{([2,2-bis{([2,2-bis[({4-[(1E)-3-methoxy-3-oxo-1-propenyl]benzoyl}oxy)methyl]propanoyl]oxy)methyl]propanoyl]oxy)methyl}propanoate 0.832 g (3.70 mmol) 4-[(1E)-3-methoxy-3-oxo-1-propenyl]benzoyl chloride dissolved in 5 ml dichloromethane, was added to a solution of 0.453 mg (0.370 mmol) 11-[(3,5-dinitrobenzoyl)oxy]undecyl 2,2-bis{([2,2-bis{([2,2-bis(hydroxymethyl)propanoyl]oxy)methyl]propanoyl]oxy)methyl}propanoate, 45 mg (0.370 mmol) 4-dimethylamino pyridine, 0.450 g (4.44 mmol) triethylamine in 10 ml dichloromethane at 0° C. The reaction mixture was allowed to react 1 hour at 0° C., then warm to 25° C., stirred overnight and reduced in volume by evaporation. Chromatography of the residue yield 11-[(3,5-dinitrobenzoyl)oxy]undecyl 2,2-bis{([2,2-bis{([2,2-bis[({4-[(1E)-3-methoxy-3-oxo-1-propenyl]benzoyl}oxy)methyl]propanoyl]oxy)methyl]propanoyl]oxy)methyl}propanoate.

Preparation of 11-{2,2-bis[({2,2-bis[({2,2-bis[({4-[(1E)-3-methoxy-3-oxo-1-propenyl]benzoyl}oxy)methyl]propanoyl}oxy)methyl]propanoyl}oxy)methyl]propanoyl}undecyl 3,5-diaminobenzoate Preparation can be carried out analogously to Example 1 using 0.540 g (0.20 mmol) 11-[(3,5-dinitrobenzoyl)oxy]undecyl 2,2-bis{([2,2-bis{([2,2-bis[({4-[(1E)-3-methoxy-3-oxo-1-propenyl]benzoyl}oxy)methyl]propanoyl]oxy)methyl]propanoyl]oxy)methyl}propanoate, 0.324 g (1.20 mmol) Ferric chloride hexahydrate and 0.131 g (2.00 mmol) Zinc powder, to yield 11-{2,2-bis[({2,2-bis[({2,2-bis[({4-[(1E)-3-methoxy-3-oxo-1-propenyl]benzoyl}oxy)methyl]propanoyl} oxy)methyl]propanoyl}oxy)methyl]propanoyl}undecyl 3,5-diaminobenzoate.

EXAMPLE 10

Production of an Orientation Layer

A 2% solution of Polyamic Acid 1 in cyclopentanone was filtered over a 0.2 μm Teflon filter and applied to a glass plate, which had been coated with indium-tin oxide (ITO), in a spin-coating apparatus at 3000 rev./min. in the course of 60 seconds. The resulting film was then predried for 15 minutes at 130° C. and then imidised for 1 hour at 200° C. to form the polyimide.

The glass plate so coated was then irradiated for 30 seconds with the linearly polarized UV light of a 350 W high-pressure mercury vapor lamp. A liquid-crystalline mixture CB-483 from Vantico was then applied by spin-coating to the irradiated layer and subsequently crosslinked by isotropic UV light for 5 minutes. Under a polarization microscope, a uniaxially double-refractive layer of oriented liquid crystal molecules was observed and a contrast ratio as high as 1800:1 was measured. Using a tilt compensator it was ascertained that the direction of orientation agreed with the direction of polarization of the UV light used for the polyimide layer irradiation.

EXAMPLE 11

Production of an Orientation Layer Having a Defined Angle of Tilt

Two glass plates coated with Polyamic Acid 1 as in Example 10 were irradiated for 30 seconds with linearly polarized UV light, the direction of incidence of the light being inclined by 40° relative to the plate normal. The direction of polarization of the light was kept in the plane defined by the direction of incidence of the light and the plate normal. From both plates a cell of 20 μm spacing was built such that the illuminated surfaces were facing each other and the previous polarization directions of illumination were parallel. The cell was then filled with liquid crystal mixture MLC12000-000 from Merck in the isotropic phase at 100° C. The cell was then gradually cooled to room temperature at a rate ranging from 0.1° C./min to 2° C./min. Between crossed polarizers a uniformly oriented liquid crystal layer was observed. The tilt angle of this parallel cell, by crystal rotation method, was 12°.

EXAMPLE 12

Determination of the Voltage Holding Ratio (VHR)

Two glass plates coated in accordance with Example 10 were irradiated perpendicularly during 30 seconds with linearly polarized UV light. From both plates a cell of 10 μm spacing was built such that the illuminated surfaces were facing each other and the previous polarization directions of illumination were parallel. This cell was then maintained at 120° C. under high vacuum for 14 hours and thereafter filled with TFT liquid crystal mixture MLC12000-000 from Merck in vacuo at room temperature. Between crossed polarizers a uniformly oriented liquid crystal layer was observed. Prior to testing the voltage holding ratio (VHR) the cell was first subjected to ageing for 50 hours at 120° C. The voltage decay V (at T=20 ms) of a voltage surge of 64 μs with $V_0$ (V at t=0)=0.2 V was then measured over a period of T=20 ms. The voltage holding ratio then determined, given by $VHR=V_{rms}$ (t=T)/$V_0$, was 96% at room temperature.

We claim:
1. A photoactive side-chain polymer from the class of polyimides, polyamide acids or esters thereof, wherein the photoactive side-chain polymer comprises as a side-chain a dendritic block incorporating photoactive groups at the surface of the dendritic block.
2. A polymer according to claim 1, wherein the dendritic block represents a unit of formula Ia or of formula Ib or a combination of formulae Ia and Ib:

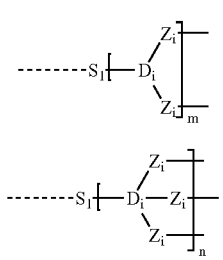

wherein the broken line symbolizes the linkage to the polymer main chain; and wherein
$S_1$ represents a single bond or a spacer unit;
$D_i$ each independently of the other, represents an organic residue;
$Z_i$ each independently of the other, represents a single bond or a spacer unit; and
m and n, each independently of the other, represent the number of generations and wherein m and n, each independently of the other, has a value of 0 to 4, with the proviso that $2 \leq m+n \leq 4$.

3. A polymer according to claim 2, wherein the terminal moieties attached to $Z_i$ at the dendritic block surface are photoactive groups, which can be photoisomerised or photodimerised on exposure to UV or laser light.

4. A polymer according to claim 1, wherein the terminal moieties attached at the dendritic block surface are, independently of each other, hydrogen, or a straight-chain or branched alkyl group,
wherein the straight-chain or branched alkyl group is unsubstituted, mono- or poly-substituted by fluorine, chlorine, or cyano,
wherein the straight-chain or branched alkyl group has 1 to 24 carbon atoms, and
wherein one or more —$CH_2$— groups in the straight-chain or branched alkyl group may independently be replaced by a group A, wherein
A represents a group selected from the group consisting of —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH═CH—, —C≡C—, —O—CO—O—, —Si($CH_3$)$_2$—O—Si($CH_3$)$_2$—, an aromatic group and an alicyclic group, and wherein
$R^1$ represents a hydrogen atom or lower alkyl,
provided that oxygen atoms are not directly attached to each other; with the proviso that at least four terminal moieties are photoactive groups.

5. A polymer according to claim 2, wherein the dendritic block represents a unit of formula Ia.

6. A polymer according to claim 2, wherein the dendritic block represents a unit of formula Ic:

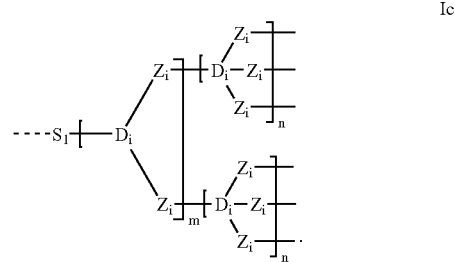

7. A polymer according to claim 2, wherein the groups $D_i$ are, each independently of the other, an aromatic, an alicyclic or a —$CR^1$ unit, wherein $R^1$ is a hydrogen atom or lower alkyl.

8. A polymer according to claim 2, wherein the groups $D_i$, each independently of the other, are selected from the group consisting of 1,2,3-benzenetriyl, 1,3,4-benzenetriyl, 1,3,5-benzenetriyl and a group —$CR^1$, wherein $R^1$ is a hydrogen atom or lower alkyl.

9. A polymer according to claim 2, wherein $S_1$ is selected from the group consisting of a single covalent bond, —O—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH═CH—, —C≡C—, —O—CO—O— and a straight-chain or branched alkylene group, wherein the straight-chain or branched alkylene group is optionally substituted by one or more groups selected from the group consisting of fluorine, chlorine and cyano, and wherein optionally two or three non-adjacent alkylene —CH$_2$— groups in the straight-chain or branched alkylene group are independently replaced by a group A, with the proviso that the total number of chain carbon atoms in the alkylene group does not exceed 24, wherein A represents a group selected from the group consisting of —O—, —CO—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, —Si(CH$_3$)$_2$—O—Si(CH$_3$)$_2$—, an aromatic group and an alicyclic group, and wherein R$^1$ represents a hydrogen atom or lower alkyl.

10. A polymer according to claim 9, wherein S$_1$ is selected from the group consisting of a single covalent bond, —CO—O—, —O—CO—, —(CH$_2$)$_r$—, —(CH$_2$)$_r$—O—, —(CH$_2$)$_r$—CO—, —(CH$_2$)$_r$—CO—, —(CH$_2$)$_r$—CO—O—, —(CH$_2$)$_r$—O—CO—, —(CH$_2$)$_r$—CO—NR$^1$—, —(CH$_2$)$_r$—NR$^1$—CO—, —(CH$_2$)$_r$—NR$^1$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —O—(CH$_2$)$_r$—CO—O—, —O—(CH$_2$)$_r$—O—CO—, —O—(CH$_2$)$_r$—CO—NR$^1$—, —O—(CH$_2$)$_r$—CO—O—, —O—(CH$_2$)$_r$—NR$^1$—, —O—(CH$_2$)$_r$—O—, —O—(CH$_2$)$_r$—NR$^1$—CO—, —NR$^1$—(CH$_2$)$_r$—CO—O—, —NR$^1$—(CH$_2$)$_r$—O—, —NR$^1$—(CH$_2$)$_r$—NR$^1$—, —NR$^1$—(CH$_2$)$_r$—O—CO—, —CO—NR$^1$—(CH$_2$)$_r$—O—, —CO—NR$^1$—(CH$_2$)$_r$—NR$^1$—, —CO—NR$^1$—(CH$_2$)$_r$—O—CO—, —O—CO—(CH$_2$)$_r$—CO—, —O—CO—(CH$_2$)$_r$—O—, —O—CO—(CH$_2$)$_r$—NR$^1$—, —O—CO—(CH$_2$)$_r$—CO—O—, —O—CO—(CH$_2$)$_r$—CO—NR$^1$—, —O—CO—(CH$_2$)$_r$—NR$^1$—CO—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^1$—CO—(CH$_2$)$_s$—O—, —(CH$_2$)$_r$—NR$^1$—CO—O—(CH$_2$)$_s$—O—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$—, —O—(CH$_2$)$_r$—CO—O—(CH$_2$)$_s$—O—, —O—(CH$_2$)$_r$—O—(CH$_2$)$_s$—O—, —O—(CH$_2$)$_r$—NR$^1$—CO—(CH$_2$)$_s$—O, —O—(CH$_2$)$_r$—NR$^1$—CO—O—(CH$_2$)$_s$—O—, —CO—O—(CH$_2$)$_r$—O—(CH$_2$)$_s$— and —CO—O—(CH$_2$)$_r$—O—(CH$_2$)$_s$—O—, wherein r and s, each independently of the other, represent an integer from 1 to 20, and wherein r+s≦21.

11. A polymer according to claim 9, wherein S$_1$ is selected from the group consisting of —(CH$_2$)$_r$—, —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —O—(CH$_2$)$_r$—, —CO—O—(CH$_2$)$_r$—, —CO—NH—(CH$_2$)$_r$—, —O—CO—(CH$_2$)$_r$—, —O—CO—(CH$_2$)$_r$—CO—O—, —O—(CH$_2$)$_r$—O—CO—, —O(CH$_2$)$_r$CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —(CH$_2$)$_r$—NH—CO—(CH$_2$)$_s$—, —(CH$_2$)$_r$—NH—CO—O—(CH$_2$)$_s$—, —(CH$_2$)$_r$—O—(CH$_2$)$_s$—O—, —(CH$_2$)$_r$—NH—CO—(CH$_2$)$_s$—O—, —(CH$_2$)$_r$—NH—CO—O—(CH$_2$)$_s$—O—, —O—(CH$_2$)$_r$—NH—CO—(CH$_2$)$_s$—, —O—(CH$_2$)$_r$—O—(CH$_2$)$_s$—O—, —O—(CH$_2$)$_r$—NH—CO—(CH$_2$)$_s$—O— and —O—CO—(CH$_2$)$_r$—NH—CO—(CH$_2$)$_s$—O—, wherein r and s each independently of the other, represent an integer from 2 to 12 and r+s≦15.

12. Polymer according to claim 9, wherein S$_1$ is selected from the group consisting of 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, 1,12-dodecylenedioxy, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl)butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyleneiminocarbonyloxy)hexylene, 6-(3-propyleneiminocarbonyl)hexylene.

13. A polymer according to claim 2, wherein $Z_i$ each independently of the other are selected from the group consisting a single covalent bond, —O—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O— and a straight-chain or branched alkylene group,
  wherein optionally one to three non-adjacent alkylene —CH$_2$— groups are independently replaced by a group selected from the group consisting of —O—, —CO—O—, —O—CO—, and —CH=CH—, with the proviso that the total number of chain carbon atoms in the alkylene group does not exceed 16, wherein R$^1$ represents a hydrogen atom or lower alkyl.

14. A polymer according to claim 13, wherein $Z_i$ each independently of the other are selected from the group consisting of a single covalent bond, —O—, —CO—O—, —O—CO—, —NR$^1$—CO—, —CO—NR$^1$—, and a straight-chain or branched alkylene group wherein optionally one to three non-adjacent alkylene —CH$_2$— groups in the straight-chain or branched alkylene group are independently replaced by a group selected from the group consisting of —O—, —CO—O—, —O—CO—, with the proviso that the total number of chain carbon atoms in the alkylene group does not exceed 12.

15. A polymer according to claim 1, wherein the photoactive groups undergo photocyclisation reactions and are represented by one of the general formulae IIIa or IIIb:

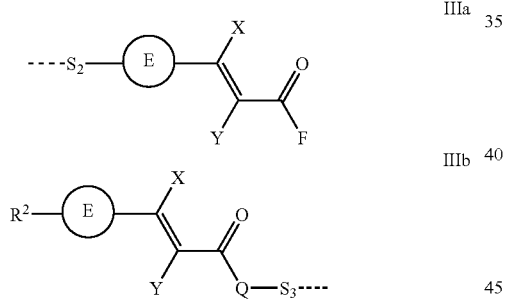

wherein the broken line indicates the point of linkage to the respective $Z_1$; and wherein
$S_2$ and $S_3$ each independently of the other, represent a single bond or a spacer unit;
Q represents an oxygen atom or —NR$^1$—;
E represents pyrimidine-2,5-diyl, pyridine-2,5-diyl, 2,5-thiophenylene, 2,5-furanylene, 1,4-naphthylene, 2,6-naphthylene, or phenylene; wherein E is unsubstituted or mono- or poly-substituted by fluorine, or chlorine or by a cyclic, straight-chain or branched alkyl residue,
wherein the cyclic, straight-chain or branched alkyl residue is unsubstituted, mono- or poly-substituted by fluorine or chlorine,
wherein the straight-chain or branched alkyl residue has 1 to 18 carbon atoms and, when present, the cyclic alkylene residue has 3 to 18 ring atoms,;
wherein one or more non-adjacent —CH$_2$— groups in the cyclic, straight-chain or branched alkyl residue may independently be replaced by a group B;

F represents —OR$^3$, —NR$^4$R$^5$ or F represents an oxygen atom attached by a single bond to ring E to define, together with the ring E a coumarin unit, and wherein R$^3$, R$^4$ and R$^5$, each independently of the other, are selected from the group consisting of hydrogen, and a cyclic, straight-chain or branched alkylene residue, wherein the cyclic, straight-chain or branched alkylene residue is unsubstituted, mono- or poly-substituted by fluorine or chlorine,
wherein the straight-chain or branched ailcylene residue has 1 to 24 carbon atoms and, when present, the cyclic ailcylene residue has 3 to 24 ring atoms,
wherein one or more non-adjacent —CH$_2$— groups in the cyclic, straight-chain or branched alkylene residue may independently be replaced by a group A, or
R$^4$ and R$^5$ together form a C$_{5-8}$ alicyclic ring;
X, Y each independently of the other, represents hydrogen, fluorine, chlorine, cyano, or alkyl,
wherein the alkyl is optionally substituted by fluorine,
wherein the alkyl has 1 to 12 carbon atoms, and
wherein, optionally, one or more non-adjacent alkyl —CH$_2$— groups in the alkyl are replaced by —O—, —CO—O—, —O—CO— or —CH=CH—;
R$^1$ represents a hydrogen atom or lower ailcyl; and
R$^2$ is hydrogen, or is a straight-chain or branched alkyl residue wherein the straight-chain or branched alkyl residue is unsubstituted, mono-substituted by cyano, fluorine, or chlorine, or poly-substituted by fluorine or chlorine,
wherein the straight-chain or branched alkyl residue has 1 to 18 carbon atoms, and
wherein one or more non-adjacent —CH2— groups in the straight-chain or branched alkyl residue may independently be replaced by a group A;
A represents a group selected from the group consisting of —O—, —CO—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, —Si(CH$_3$)$_2$—O—Si(CH$_3$)$_2$—, an aromatic group and an alicyclic group; and
B represents a group selected from the group consisting of —O—, —CO—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O— and —Si(CH$_3$)$_2$—O—Si(CH$_3$)$_2$—.

16. A polymer according to claim 15, wherein the group E is selected from the group consisting of pyrimidine-2,5-diyl, pyridine-2,5-diyl, 2,5-thiophenylene, 2,5-furanylene, 1,4-naphthylene, 2,6-naphthylene and phenylene,
wherein the group E which is unsubstituted or substituted by a cyclic, straight-chain or branched alkyl residue,
wherein the cyclic, straight-chain or branched alkyl residue is unsubstituted, mono- or poly-substituted by fluorine or chlorine,
wherein the straight-chain or branched alkyl residue has from 1 to 12 carbon atoms and, when present, the cyclic alkylene residue has 3 to 12 ring atoms,
wherein optionally one or more non-adjacent alkyl —CH$_2$— groups in the cyclic, straight-chain or branched alkyl residue are replaced by —O—, —CO—, —CO—O—, —O—CO—, —CH=CH—, or —C≡C—.

17. A polymer according to claim 16, wherein the group E is selected from the group consisting of 2,5-furanylene, 1,4— naphthylene; 2,6-naphthylene and phenylene,
   wherein the group E is unsubstituted or substituted by a cyclic, straight-chain or branched alkyl residue,
   wherein the group E has 1 to 6 carbon atoms and, when present, the cyclic alkylene residue has 3 to 6 ring atoms, and
   wherein optionally one or more non-adjacent alkyl —CH2— groups in the group E are replaced by —O—, —CO—, —CO—O—, —O—CO—, —CH=CH— or —C≡C—.

18. A polymer according to claim 15, wherein F is selected from the group consisting of —OR$^3$ and —NR$^4$R$^5$, wherein R$^3$ and R$^4$ represent, each independently of the other, a cyclic, straight-chain or branched alkyl residue,
   wherein the cyclic, straight-chain or branched alkyl residue is unsubstituted, mono- or poly-substituted by fluorine, chlorine, or cyano, wherein the straight-chain or branched alkyl residue has having 1 to 18 carbons atoms and, when present, the cyclic aikylene residue has 3 to 18 ring atoms,
   wherein one or more non-adjacent alkyl —CH$_2$— groups in the cyclic, straight-chain or branched alkyl residue may independently be replaced by —O— or —CH=CH—, and
   R$^5$ is a hydrogen atom or a cyclic, straight-chain or branched alkyl residue,
   wherein the cyclic, straight-chain or branched alkyl residue is unsubstituted, mono- or poly-substituted by fluorine, chlorine, or cyano, wherein the straight-chain or branched alkyl residue has having 1 to 18 carbons atoms and, when present, the cyclic alkylene residue has 3 to 18 ring atoms, and
   wherein one or more non-adjacent alkyl —CH$_2$— groups in the cyclic, straight-chain or branched atkyl residue may independently be replaced by —O— or —CH=CH—, or
   R$^4$ and R$^5$ together form a C$_{5-8}$ alicyclic ring.

19. A polymer according to claim 18, wherein, F is selected from the group consisting of —OR$^3$ and —NHR$^4$, wherein R$^3$ and R$^4$ represent a cyclic, straight-chain or branched alkyl residue,
   wherein the cyclic straight-chain or branched alkyl residue is unsubstituted, mono- or poly-substituted by fluorine atoms,
   wherein the straight-chain or branched alkyl residue has 1 to 18 carbon atoms and, when present, the cyclic alkylene residue has 3 to 18 ring atoms, and
   wherein one or more non-adjacent alkyl —CH2— groups in the cyclic, straight-chain or branched alkyl residue may independently be replaced by —O—.

20. A polymer according to claim 15, wherein X and Y represent hydrogen.

21. A polymer according to claim 15, wherein Q is an oxygen atom or —NH—.

22. A polymer according to claim 15, wherein the photoactive groups are represented by the general formula IIIa.

23. A polymer according to claim 15, wherein S$_2$ and S$_3$ are selected from the group consisting of a single covalent bond, —O—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O— and a straight-chain or branched alkylene group,
   wherein the straight-chain or branched alkylene group is optionally substituted by one or more groups selected from the ground consisting of fluorine, chlorine and cyano, and
   wherein optionally two or three non-adjacent alkylene —CH$_2$— groups are independently replaced by a group A,
   with the proviso that the total number of chain carbon atoms in the alkylene group does not exceed 24.

24. A polymer according to claim 23, wherein S$_2$ is selected from the group consisting of a single covalent bond, —CO—O—, —O—CO—, —(CH$_2$)$_r$—, —(CH$_2$)$_r$—O—, —(CH$_2$)$_r$—CO—, —(CH$_2$)$_r$—CO—, —(CH$_2$)$_r$—CO—O—, —(CH$_2$)$_r$—O—CO—, —(CH$_2$)$_r$—CO—NR$^1$—, —(CH$_2$)$_r$—NR$^1$—CO—, —(CH$_2$)$_r$—NR$^1$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —O—(CH$_2$)$_r$—CO—O—, —O—(CH$_2$)$_r$—O—CO—, —O—(CH$_2$)$_r$—CO—NR$^1$—, —O—(CH$_2$)$_r$—CO—O—, —O—(CH$_2$)$_r$—NR$^1$—, —O—(CH$_2$)$_r$—O—, —O—(CH$_2$)$_r$—NR$^1$—CO—, —NR$^1$—(CH$_2$)$_r$—CO—O—, —NR$^1$—(CH$_2$)$_r$—O—, —NR$^1$—(CH$_2$)$_r$—NR$^1$—, —NR$^1$—(CH$_2$)$_r$—O—CO—, —CO—NR$^1$—(CH$_2$)$_r$—O—, —CO—NR$^1$—(CH$_2$)$_r$—NR$^1$—, —CO—NR$^1$—(CH$_2$)$_r$—O—CO—, —O—CO—(CH$_2$)$_r$—CO—, —O—CO—(CH$_2$)$_r$—O—, —O—CO—(CH$_2$)$_r$—NR$^1$—, —O—CO—(CH$_2$)$_r$—CO—O—, —O—CO—(CH$_2$)$_r$—CO—NR$^1$—, —O—CO—(CH$_2$)$_r$—NR$^1$—CO—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^1$—CO—(CH$_2$)$_s$—O—, —(CH$_2$)$_r$—NR$^1$CO—O—(CH$_2$)$_s$—O—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$—, —O—(CH$_2$)$_r$—CO—O—(CH$_2$)$_s$—O—, —O—(CH$_2$)$_r$—O—(CH$_2$)$_s$—O—, —O—(CH$_2$)$_r$—NR$^1$—CO—(CH$_2$)$_s$—O—, —O—(CH$_2$)$_r$—NR$^1$—CO—O—(CH$_2$)$_s$—O—, —CO—O—(CH$_2$)$_r$—O—(CH$_2$)$_s$— and —CO—O(CH$_2$)$_r$—O—(CH$_2$)$_s$—O—, wherein r and s, each independently from the other, represent an integer from 1 to 20, and wherein r+s≦21.

25. A polymer according to claim 23, wherein S$_2$ is selected from the group consisting of a single covalent bond, —(CH$_2$)$_r$—, —(CH$_2$)$_r$—O—, —(CH$_2$)$_r$—CO—O—, —(CH$_2$)$_r$—O—CO—, —(CH$_2$)$_r$—CO—NH—, —(CH$_2$)$_r$—NH—CO—, —O—(CH$_2$)$_r$—, —CO—O—(CH$_2$)$_r$—, —CO—NH—(CH$_2$)$_r$—, —O—CO—(CH$_2$)$_r$—, —O—CO—(CH$_2$)$_r$—CO—O—, —O—(CH$_2$)$_r$—O—CO—, —O—(CH$_2$)$_r$CO—NH—, —O—(CH$_2$)$_r$—NH—CO—, —CO—O—(CH$_2$)$_r$—O—, —CO—NH—(CH$_2$)$_r$—O—, —O—(CH$_2$)$_r$—O—, —(CH$_2$)$_r$—NH—CO—(CH$_2$)$_s$—, —(CH$_2$)$_r$—NH—CO—O—(CH$_2$)$_s$—, —(CH$_2$)$_r$—O—(CH$_2$)$_s$—O—, —(CH$_2$)$_r$—NH—CO—(CH$_2$)$_s$—O—, —(CH$_2$)$_r$—NH—CO—O—(CH$_2$)$_s$—O—, —O—(CH$_2$)$_r$—NH—CO—(CH$_2$)$_s$—, —O—(CH$_2$)$_r$—O—(CH$_2$)$_s$—O—, —O—CO—(CH$_2$)$_r$—O—(CH$_2$)$_s$—O—, —CO—O—(CH$_2$)$_r$—O—(CH$_2$)$_s$—O—, —O—(CH$_2$)$_r$NH—CO—(CH$_2$)$_s$—O— and —O—CO—(CH$_2$)$_r$—NH—CO—(CH$_2$)$_s$—O—, wherein r and s, each independently from the other, represent an integer from 1 to 12 and wherein r+s≦15.

26. A polymer according to claim 23, wherein S$_2$ is selected from the group consisting of 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-rionyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexyl, 6-(3-propyleneiminocarbonyl)hexyloxy, 1,2-ethylenedioxy, 1,3-propylenedioxy, 1,4-butylenedioxy, 1,5-pentylenedioxy, 1,5-hexylenedioxy, 1,7-heptylenedioxy, 1,8-octylenedioxy, 1,9-nonylenedioxy, 1,10-decylenedioxy, 1,11-undecylenedioxy, and 1,12-dodecylenedioxy.

27. A polymer according to any one of claim 23, wherein $S_3$ is selected from the group consisting of a single covalent bond, —$(CH_2)_r$—, —$(CH_2)_r$—O—, —$(CH_2)_r$—CO—, —$(CH_2)_r$—CO—O—, —$(CH_2)_r$—O—CO—, —$(CH_2)_r$—CO—$NR^1$—, —$(CH_2)_r$—$NR^1$—CO—, —$(CH_2)_r$—$NR^1$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^1$—CO—$(CH_2)_s$—, —$(CH_2)_r$—$NR^1$—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^1$—CO—$(CH_2)_s$—O—, —$(CH_2)_r$—$NR^1$—CO—O—$(CH_2)_s$—O—, —$(CH_2)_r$—O—$(CH_2)_s$—CO—O— and —$(CH_2)_r$—O—$(CH_2)_s$—O—CO—, wherein r and s each independently from the other, represent an integer from 1 to 20 and wherein r+s≦21.

28. A polymer according to claim 27, wherein $S^3$ is selected from the group consisting of 1,2-ethylene, 1,3-propylene, 1,4-butylene, 1,5-pentylene, 1,6-hexylene, 1,7-heptylene, 1,8-actylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-prop yleneoxy)hexyleneoxy, 6-(3-propyleneiminocarbonyloxy)hexyleneoxy, 6-(3-propyleneiminocarbonyl)hexylene, and 6-(3-propyleneiminocarbonyl)hexyleneoxy.

29. A polymer as claimed in claim 1, wherein the monomer units from which the main chain of the side-chain polymer is built up, are imide groups of the general formula IV, VI or VIII; or the analogous amie acid groups or amic acid ester groups of the general formula V, VII or IX; or are a combination thereof:

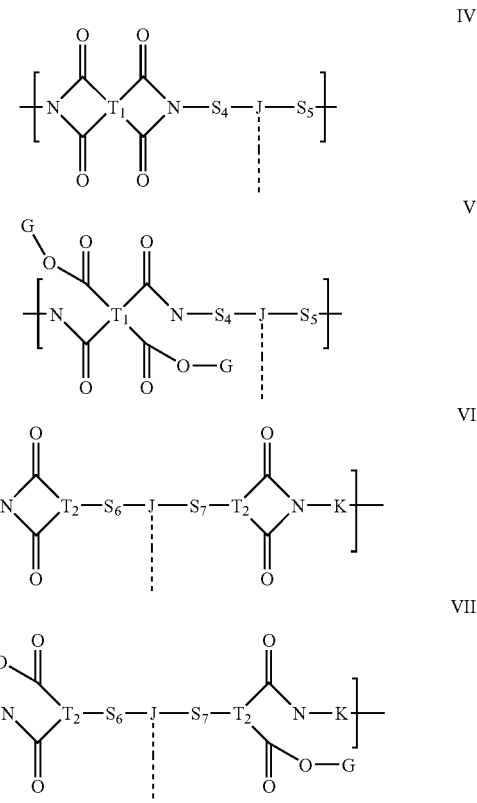

wherein:

each broken line symbolises the linkage to $S^i$;

T, represents a tetravalent organic radical;

$T_2$, $T_3$ each independently represent a trivalent aromatic or trivalent alicyclic group, wherein the trivalent aromatic or trivalent alicyic group is unsubstituted or substituted by fluorine, chlorine or cyano or by a cyclic, straight-chain or branched alkyl residue, wherein the cyclic straight-chain or branched alkyl residue is unsubstituted mono- or poly-substituted by fluorine or chlorine, wherein the straight-chain or branched alkyl residue has 1 to 18 carbon atoms and, when present, the cyclic alkylene residue has 3 to 18 ring atoms, wherein one or more non-adjacent —$CH_2$— groups in the cyclic, straight-chain or branched alkyl residue may independently be replaced by a group selected from the ground consisting of —O—, —CO—, —CO—O—, —O—CO—, —CH=CH— and —C≡C—;

$S_4$ to $S_8$ each independently of the other, represent a single bond or a spacer unit, J is selected from the group consisting of a nitrogen atom, a group —$CR^1$—, an aromatic divalent, trivalent or tetravalent group, and an alicyclic divalent, trivalent or tetravalent group, wherein the aromatic divalent, trivalent or tetravalent group, or the alicyclic divalent, trivalent or tetravalent group is unsubstituted, mono- or poly-substituted by fluorine, chlorine, or cyano or by a cyclic, straight-chain or branched alkyl residue, wherein the cyclic, straight-chain or branched alkyl residue is unsubstituted, mono- or poly-substituted by fluorine or chlorine, wherein the straight-chain or branched alkyl residue has 1 to 18 carbon atoms and, when present, the cyclic alkylene residue has 3 to 18 ring atoms, wherein one or more non-adjacent —$CH_2$— groups in the cyclic, straight-chain or branched alkyl residue may independently be replaced by a group selected from the group consisting of —O—, —CO—, —CO—O—, —O—CO—, —CH=CH— and —C≡C—, $R^1$ represents a hydrogen atom or lower alkyl;

K represents a divalent aliphatic, alicyclic or aromatic radical; and

G represents a hydrogen atom or a monovalent organic group.

30. A polymer according to claim 29, wherein $T_1$ is derived from an aliphatic, alicyclic or aromatic tetracarboxylic acid dianhydride.

31. A polymer according to claim 30, wherein the tetracarboxylic acid dianhydrides used to form the tetravalent organic radical $T_1$ is selected from the group consisting of 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 5-(2,5-dioxotetrahydrofuran-3-yl)-3-methyl-3-cyclohexene-1,2-dicarboxylic acid dianhydride, 4-(2,5-dioxotefrahydrofuran-3-yl)tetrahydronaphthalene-1,2-dicarboxylic acid dianhydride, 4,4'-(hexafluoroisopropylidene)diphthalic acid dianhydride and bicyclo[2.2.2]oct-7-ene-2,3,5,6-tetracarboxylic acid dianhydride.

32. A polymer according to claim 29, characterized wherein $T_2$ and $T_3$, independently of each other, are derived from an aliphatic, alicyclic or aromatic dicarboxylic acid anhydride.

33. A polymer according to claim 32, wherein $T_2$ and $T_3$, independently of each other, are trivalent aromatic or alicyclic groups, wherein the three valencies of the trivalent aromatic or alicyclic group are distributed between three different carbon atoms, with the proviso that two of the valencies are located at adjacent carbon atoms.

34. A polymer according to claim 32, wherein $T_2$ and $T_3$, independently of each other, are trivalent benzene derivatives.

35. A polymer according to claim 29, wherein $S_4$ is selected from the group consisting of a single covalent bond, —$(CH_2)_r$—, —$(CH_2)_r$—O—, —$(CH_2)_r$—CO—, —$(CH_2)_r$—CO—O—, —$(CH_2)_r$—O—CO—, —$(CH_2)_r$—O—CO—O—, —$(CH_2)_r$—$NR^1$—, —$(CH_2)_r$—$NR^1$—CO—, —$(CH_2)_r$—$NR^1$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^1$—CO—$(CH_2)_s$—, —$(CH_2)_r$—$NR^1$—CO—O—$(CH_2)_s$—, —$(CH_2)_r$—O—$(CH_2)_s$—O—, —$(CH_2)_r$—CO—O—$(CH_2)_s$—O—, —$(CH_2)_r$—O—CO—$(CH_2)_s$—O—, —$(CH_2)_r$—$NR^1$—CO—$(CH_2)_s$—O—, —$(CH_2)_r$—$NR^1$—CO—O—$(CH_2)_s$—O—, —$(CH_2)_r$—O—$(CH_2)_s$—CO—O— and —$(CH_2)_r$—O—$(CH_2)_s$—O—CO—, wherein r and s each independently from the other, represent an integer from 1 to 20 and wherein r+s≤21.

36. A polymer according to claim 35, wherein S4 is selected from the group consisting of 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, and 6-(3-propyleneiminocarbonyl)hexyleneoxy.

37. A polymer according claim 29, wherein S5 and S8, independently of each other, are selected from the group consisting of a single bond, —$(CH_2)_r$—, —O—$(CH_2)_r$—, —CO—$(CH_2)_r$—, —CO—O—$(CH_2)_r$—, —O—CO—$(CH_2)_r$—, —$NR^1$—CO—$(CH_2)_r$—, —$NR^1$—$(CH_2)_r$—, —CO—$NR^1$—$(CH_2)_r$—, —$NR^1$—CO—$(CH_2)_r$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—$NR^1$—CO—$(CH_2)_s$—, —$(CH_2)_r$—$NR^1$CO—O—$(CH_2)_s$—, —O—$(CH_2)_r$—O—$(CH_2)_s$—, —O—$(CH_2)_r$—CO—O—$(CH_2)_s$—, —O—$(CH_2)_r$—O—CO—$(CH_2)_s$—, —O—$(CH_2)_r$—$NR^1$—CO—$(CH_2)_s$—, —O—$(CH_2)_r$—$NR^1$—CO—O—$(CH_2)_s$—, —O—CO—$(CH_2)_r$—O—$(CH_2)_s$— and —CO—O—$(CH_2)_r$—O—$(CH_2)_s$—, wherein r and s, each independently from the other, represent an integer from 1 to 20 and wherein r+s≤21.

38. A polymer according to claim 37, wherein $S_5$ and S8, independently of each other, are selected from the ground consisting of 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 2-oxyethylene, 3-oxypropylene, 4-oxybutylene, 5-oxypentylene, 6-oxyhexylene, 7-oxyheptylene, 8-oxyoctylene, 9-oxynonylene, 10-oxydecylene, 11-oxyundecylene, 12-oxydodecylene, 2-(oxycarbonyl)ethylene, 3-(oxycarbonyl)propylene, 4-(oxycarbonyl) butylene, 5-(oxycarbonyl)pentylene, 6-(oxycarbonyl)hexylene, 7-(oxycarbonyl)heptylene, 8-(oxycarbonyl)octylene, 9-(oxycarbonyl)nonylene, 10-(oxycarbonyl)decylene, 11-(oxycarbonyl)undecylene, 12-(oxycarbonyl)dodecylene, 2-(carbonyloxy)ethylene, 3-(carbonyloxy)propylene, 4-(carbonyloxy)butylene, 5-(carbonyloxy)pentylene, 6-(carbonyloxy)hexylene, 7-(carbonyloxy)heptylene, 8-(carbonyloxy)octylene, 9-(carbonyloxy)nonylene, 10-(carbonyloxy)decylene, 11-(carbonyloxy)undecylene, 12-(carbonyloxy)dodecylene, 2-(carbonylimino)ethylene, 3-(carbonylimino)propylene, 4-(carbonylimino)butylene, 5-(carbonylimino)pentylene, 6-(carbonylimino)hexylene, 7-(carbonylimino)heptylene, 8-(carbonylimino)octylene, 9-(carbonylimino)nonylene, 10-(carbonylimino)decylene, 11-(carbonylimino)undecylene, 12-(carbonylimino)dodecylene, 2-iminoethylene, 3-iminopropylene, 4-iminobutylene, 5-iminopentylene, 6-iminohexylene, 7-iminoheptylene, 8-iminooctylene, 9-iminononylene, 10-iminodecylene, 11-iminoundecylene, 12-iminododecylene, 2-iminocarbonylethylene, 3-iminocarbonylpropylene, 4-iminocarbonylbutylene, 5-iminocarbonylpentylene, 6-iminocarbonylhexylene, 7-iminocarbonylheptylene, 8-iminocarbonyloctylene, 9-iminocarbonylnonylene, 10-iminocarbonyldecylene, 11-iminocarbonylundecylene, 12-iminocarbonyldodecylene, 2-(2-ethyleneoxy)ethylene, 2-(3-propyleneoxy)ethylene, 6-(4-butyleneoxy)hexylene, 2-(2-ethyleneiminocarbonyl)ethylene, 2-(3-propyleneiminocarbonyl)ethylene, 6-(4-butyleneiminocarbonyl)hexylene, 6-(3-propyieneiminocarbonyloxy)hexylene, and 6-(3-propyleneiminocarbonyl) hexylene.

39. A polymer according to claim 29, wherein $S_6$ and $S_7$, independently of each other, are selected from the group consisting of a single bond, —(CH$_2$)$_r$—, —(CH$_2$)$_r$—O—, —(CH$_2$)$_r$—CO—, —(CH$_2$)$_r$—CO—O—, —(CH$_2$)$_r$—O—CO—, —(CH$_2$)$_r$—CO—NR$^1$—, —(CH$_2$)$_r$—NR$^1$—CO—, —(CH$_2$)$_r$—NR$^1$—, —O—(CH$_2$)$_r$—, —CO—O—(CH$_2$)$_r$—, —O—CO—(CH$_2$)$_r$—, —NR$^1$—CO—(CH$_2$)$_r$—, —CO—NR$^1$—(CH$_2$)$_r$—, —NR$^1$—(CH$_2$)$_r$—, —O—(CH$_2$)$_r$—CO—O—, —O—(CH$_2$)$_r$—O—CO—, —O—(CH$_2$)$_r$—CO—NR$^1$—, —O—(CH$_2$)$_r$—NR$^1$—, —O—(CH$_2$)$_r$—O—, —O—(CH$_2$)$_r$—NR$^1$—CO—, —NR$^1$—(CH$_2$)$_r$—CO—O—, —NR$^1$—(CH$_2$)$_r$—O—, —NR$^1$—(CH$_2$)$_r$—NR$^1$—, —NR$^1$—(CH$_2$)$_r$—O—CO—, —CO—NR$^1$—(CH$_2$)$_r$—O—, —CO—NR$^1$—(CH$_2$)$_r$—NR$^1$—, —CO—NR$^1$—(CH$_2$)$_r$—O—CO—, —O—CO—(CH$_2$)$_r$—CO—, —O—CO—(CH$_2$)$_r$—O—, —O—CO—(CH$_2$)$_r$—O—CO—(CH$_2$)$_r$—NR$^1$—, —O—CO—(CH$_2$)$_r$—CO—O—, —O—CO—(CH$_2$)$_r$—CO—NR$^1$—, —O—CO—(CH$_2$)$_r$—NR$^1$—CO—, —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^1$—CO—(CH$_2$)$_s$—, —(CH$_2$)$_r$—NR$^1$—CO—O—(CH$_2$)$_s$—, —(CH$_2$)$_r$—O—(CH$_2$)$_s$—O—, —(CH$_2$)$_r$—CO—O—(CH$_2$)$_s$—O—, —(CH$_2$)$_r$—O—CO—(CH$_2$)$_s$—O—, —(CH$_2$)$_r$—NR$^1$—CO—(CH$_2$)$_s$—O—, —(CH$_2$)$_r$—NR$^1$CO—O—(CH$_2$)$_s$—O—, —O—(CH$_2$)$_r$—O—(CH$_2$)$_s$—, —O—(CH$_2$)$_r$—CO—O—(CH$_2$)$_s$—, —O—(CH$_2$)$_r$—NR$^1$—CO—(CH$_2$)$_s$—, —O—(CH$_2$)$_r$—NR$^1$—CO—O—(CH$_2$)$_s$—, —O—(CH$_2$)$_r$—CO—O—(CH$_2$)$_s$—O—, —O—(CH$_2$)$_r$—O—(CH$_2$)$_s$—O—, —O—(CH$_2$)$_r$—NR$^1$—CO—(CH$_2$)$_s$—O—, —O—(CH$_2$)$_r$—NR$^1$—CO—O—(CH$_2$)$_s$—O—, —CO—O—(CH$_2$)$_r$—O—(CH$_2$)$_s$—, and —CO—O—(CH$_2$)$_r$—O—(CH$_2$)$_s$—O—, wherein r and s each independently from the other, represent an integer from 1 to 20, and wherein r+s≦21.

40. A polymer according to claim 39, wherein $S_6$ and $S_7$, independently of each other, are selected from the group consisting of 1,2-ethylene, 1,3-propylene, 1,4-butylene, 1,5-pentylene, 1,6-hexylene, 1,7-heptylene, 1,8-octylene, 1,9-nonylene, 1,10-decylene, 1,11-undecylene, 1,12-dodecylene, 3-methyl-1,4-butylene, 3-propyleneoxy, 3-propyleneoxycarbonyl, 2-ethylenecarbonyloxy, 4-butyleneoxy, 4-butyleneoxycarbonyl, 3-propylenecarbonyloxy, 5-pentyleneoxy, 5-pentyleneoxycarbonyl, 4-butylenecarbonyloxy, 6-hexyleneoxy, 6-hexyleneoxycarbonyl, 5-pentylenecarbonyloxy, 7-heptyleneoxy, 7-heptyleneoxycarbonyl, 6-hexylenecarbonyloxy, 8-octyleneoxy, 8-octyleneoxycarbonyl, 7-heptylenecarbonyloxy, 9-nonyleneoxy, 9-nonyleneoxycarbonyl, 8-octylenecarbonyloxy, 10-decyleneoxy, 10-decyleneoxycarbonyl, 9-nonylenecarbonyloxy, 11-undecyleneoxy, 11-undecyleneoxycarbonyl, 10-decylenecarbonyloxy, 12-dodecyleneoxy, 12-dodecyleneoxycarbonyl, 11-undecylenecarbonyloxy, 3-propyleneiminocarbonyl, 4-butyleneiminocarbonyl, 5-pentyleneiminocarbonyl, 6-hexyleneiminocarbonyl, 7-heptyleneiminocarbonyl, 8-octyleneiminocarbonyl, 9-nonyleneiminocarbonyl, 10-decyleneiminocarbonyl, 11-undecyleneiminocarbonyl, 12-dodecyleneiminocarbonyl, 2-ethylenecarbonylimino, 3-propylenecarbonylimino, 4-butylenecarbonylimino, 5-pentylenecarbonylimino, 6-hexylenecarbonylimino, 7-heptylenecarbonylimino, 8-octylenecarbonylimino, 9-nonylenecarbonylimino, 10-decylenecarbonylimino, 11-undecylenecarbonylimino, 6-(3-propyleneiminocarbonyloxy)hexylene, 6-(3-propyleneoxy)hexylene, 6-(3-propyleneoxy)hexyleneoxy, 6-(3-propyleneiminocarbonyloxy)hexyleneoxy, 6-(3-propyleneiminocarbonyl)hexylene, 6-(3-propyleneiminocarbonyl)hexyleneoxy, 1,2-ethylenedioxy, 1,3-propylenedioxy, 1,4-butylenedioxy, 1,5-pentylenedioxy, 1,6-hexylenedioxy, 1,7-heptylenedioxy, 1,8-octylenedioxy, 1,9-nonylenedioxy, 1,10-decylenedioxy, 1,11-undecylenedioxy, and 1,12-dodecylenedioxy.

41. A polymer according to claim 29, wherein the divalent aliphatic, alicyclic or aromatic divalent radical K is derived from an aliphatic, alicyclic or aromatic diamine by formal removal of the amino groups.

42. A polymer according to claim 41, wherein the aliphatic or alicyclic diainine from which the radical K is derived is selected from the group consisting of ethylenediamine, 1,3-propylenediamine, 1,4-butylenediamine, 1,5-pentylenediamine, 1,6-hexylenediamine, 1,7-heptylenediamine, 1,8-octylenediamine, 1,9-nonylenediamine, 1,10-decylenediamine, 1,11-undecylenediamine, 1,12-dodecylenediamine, α,α'-diamino-m-xylene, α,α'-diamino-p-xylene, (5-amino2,2,4-trimethylcyclopentyl)methylamine, 1,2-diaminocyclohexane, 4,4'-diaminodicyclohexylmethane, 1,3-bis(methylamino)cyclohexane and 4,9-dioxadodecane-1,12-diamine.

43. A polymer according to claim 41, wherein the aromatic diamine from which the radical K is derived include is selected from the group consisting of 3,5-diaminobenzoic acid methyl ester, 3,5-diaminobenzoic acid hexyl ester, 3,5-diaminobenzoic acid dodecyl ester, 3,5-diaminobenzoic acid isopropyl ester, 4,4'-methylenedianiline, 4,4'-ethylenedianiline, 4,4'-diamino-3,3'-dimethyldiphenylmethane, 3,3',5,5'-tetramethylbenzidine, 4,4'-diaminodiphenyl sulfone, 4,4'-diaminodiphenyl ether, 1,5-diaminonaphthalene, 3,3'-dimethyl-4,4'-diaminobiphenyl, 3,4'-diaminodiphenyl ether, 3,3'-diaminobenzophenone, 4,4'-diaminobenzophenone, 4,4'-diamino-2,2'-dimethylbibenzyl, bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 2,7-diaminofluorene, 9,9-bis(4-aminophenyl)fluorene, 4,4'-methylenebis(2-chloroaniline), 4,4'-bis(4-aminophenoxy)biphenyl, 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(1,4-phenyleneisopropylidene)bisaniline, 4,4'-(1,3-phenyleneisopropylidene)bisaniline, 2,2-bis[4-(4-aminophenoxy)phenyl]propane, 2,2-bis[3-(4-aminophenoxy)phenyl]hexafluoropropane, 2,2-bis[3-amino-4-methylphenyl]hexafluoropropane, 2,2-bis(4-aminophenyl)hexafluoropropane, 2,2'-bis-[4-(4-amino-2-trifluoromethylphenoxy)phenyl]hexafluoropropane, 4,4'-diamino-2,2'-bis(trifluoromethyl)biphenyl, and 4,4'-bis[(4-amino-2-trifluoromethyl)phenoxy]-2,3,5,6,2',3',5',6'-octafluorobiphenyl.

44. A polymer according to claim 29, wherein the polymer comprises less than 75% of monomer units that include a divalent group J.

45. A polymer according to claim 29, wherein the polymer consists only of building blocks of formulae V, VII or IX.

46. A polymer as claimed in claim 1 having an intrinsic viscosity in the range of 0.05 to 10 dL/g, the intrinsic viscosity ($\eta_{inh}=\ln \eta_{rel}/C$) being determined by measuring a solution containing a polymer in a concentration of 0.5 g/100 ml for its viscosity at 30° C. using N-methyl-2-pyrrolidone as solvent.

47. A polymer as claimed in claim 1 containing from 2 to 2000 monomer units.

48. A polymer composition comprising a polymer as claimed in claim 1 and an additive comprising a silane-containing compound, an epoxy-containing crosslinking agent, or both a silane-containing compound and an epoxy-containing crosslinking agent.

49. A polymer layer comprising one or more polymers as claimed in claim 1 in at least partially crosslinked form.

50. A process for preparing a polymer layer as claimed in claim 49, comprising applying one or more polymers to a support and, after any imidisation step which may be necessary, crosslinking the polymer or polymer mixture by irradiation with linearly polarised light.

51. An orientation layer for liquid crystals comprising one or more polymers as claimed in claim 1 in at least partially crosslinked form.

52. An orientation layer according to claim 51, wherein the orientation layer is capable of inducing a tilt angle in an adjacent liquid crystal.

53. An optical constructional element comprising one or more polymers as claimed in claim 1 in at least partially crosslinked form.

54. An optical or electro-optical device comprising one or more polymers as claimed in claim 1 in at least partially crosslinked form.

55. An optical constructional element according to claim 53, wherein the optical constructional element comprises one or more polymer layers.

56. An unstructured or structured optical element comprising one or more polymers as claimed in claim 1.

57. A multi-layer system comprising one or more polymers as claimed in claim 1.

58. A polymer according to claim 2, wherein the spacer unit in $S_1$ represents a straight-chain or branched alkylene group,
wherein the straight-chain or branched alkylene group is unsubstituted, mono- or poly-substituted by fluorine or chlorine,
wherein the straight-chain or branched alkylene group has 1 to 30 carbon atoms, and
wherein one or more —$CH_2$— groups in the straight-chain or branched alkylene group may independently be replaced by a group A,
with the proviso that oxygen atoms are not directly attached to each other, wherein
A represents a group selected from the group consisting of —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O—, —$Si(CH_3)_2$—O—$Si(CH_3)_2$—, an aromatic group and an alicyclic group, and wherein $R^1$ represents a hydrogen atom or lower alkyl.

59. A polymer according to claim 2, wherein the spacer unit in $Z_1$ represents a straight-chain or branched alkylene group,
wherein the straight-chain or branched alkylene group is unsubstituted, mono- or poly-substituted by fluorine or chlorine,
wherein the straight-chain or branched alkylene group has 1 to 24 carbon atoms, and
wherein one or more non adjacent —$CH_2$— groups in the straight-chain or branched alkylene group may independently be replaced by a group B, wherein
B represents a group selected from the group consisting of —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O—, and —$Si(CH_3)_2$—O—$Si(CH_3)_2$—, an wherein $R^1$ represents a hydrogen atom or lower alkyl.

60. A polymer according to claim 10, wherein r and s, each independently of the other, represent an integer from 2 to 12.

61. A polymer according to claim 10, wherein r+s≦15.

62. A polymer according to claim 15, wherein the spacer unit in $S_2$ and $S_3$ represents, independently a straight-chain or branched alkylene group, wherein the straight-chain or branched alkylene group is unsubstituted, mono- or poly-substituted by fluorine or chlorine,
wherein the straight-chain or branched alkylene group has 1 to 30 carbon atoms, and
wherein one or more non-adjacent —$CH_2$— groups in the straight-chain or branched alkylene group may independently be replaced by a group A,
with the proviso that oxygen atoms are not directly attached to each other.

63. A polymer according to claim 24, wherein r and s, each independently from the other, represent an integer from 1 to 12.

64. A polymer according to claim 24, wherein r+s≦15.

65. A polymer according to claim 27, wherein r and s, each independently from the other, represent an integer from 1 to 12 and wherein r+s≦15.

66. A polymer according to claim 29, wherein the spacer unit in $S_4$ to $S_8$ represents a straight-chain or branched alkylene group,
wherein the straight-chain or branched alkylene group is unsubstituted, mono-substituted by fluorine, chlorine, or cyano; or poly-substituted by fluorine or chlorine,
wherein the straight-chain or branched alkylene group has 1 to 24 carbon atoms, and
wherein one or more non-adjacent —$CH_2$— groups in the straight-chain or branched alkylene group may independently be replaced by a group B, wherein
B represents a group selected from the group consisting of —O—, —CO—, —CO—O—, —O—CO—, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O— and —$Si(CH_3)_2$—O—$Si(CH_3)_2$—.

67. A polymer according to claim 30, wherein the alicyclic or aliphatic tetracarboxylic acid anhydride is selected from the group consisting of 1,1,4,4-butanetetracarboxylic acid dianhydride, ethylenemaleic acid dianhydride, 1,2,3,4-cyclobutanetetracarboxylic acid dianhydride, 1,2,3,4-cyclopentanetetracarboxylic acid dianhydride, 2,3,5-tricarboxycyclopentylacetic acid dianhydride, 3,5,6-tricarboxynorbornylacetic acid dianhydride, 2,3,4,5-tetrahydrofurantetracarboxylic acid dianhydride, rel-[1S,5R,6R]-3-oxabicyclo[3.2.1]octane-2,4-dione-6-spiro-3'-(tetrahydrofuran-2',5'-dione), 4-(2,5-dioxotetrahydrofuran-3-yl)tetrahydronaphthalene-1,2-dicarboxylic acid dianhydride, 5-(2,5-dioxotetrahydrofuran-3-yl)-3-methyl-3-cyclohexene-1,2-dicarboxylic acid dianhydride, bicyclo[2.2.2]oct-7-ene-2,3,5,6-tetracarboxylic acid dianhydride, bicyclo[2.2.2]octane-2,3,5,6-tetracarboxylic acid dianhydride, 1,8-dimethylbicyclo[2.2.2]oct-7-ene-2,3,5,6-tetracarboxylic acid and bicyclo[2.2.2]oct-7-ene-2,3,5,6-tetracarboxylic acid dianhydride.

68. A polymer according to claim 30, wherein the aromatic tetracarboxylic acid dianhydride is selected from the group consisting of pyromellitic acid dianhydride, 3,3',4,4'-benzophenonetetracarboxylic acid dianhydride, 4,4'-oxydiphthalic acid dianhydride, 3,3',4,4'-diphenyl-sulfonetetracarboxylic acid dianhydride, 1,4,5,8-naphthalenetetracarboxylic acid dianhydride, 2,3,6,7-naphthalenetetracarboxylic acid dianhydride, 3,3',4,4'-dimethyldiphenylsilanetetracarboxylic acid dianhydride, 3,3',4,4'-tetra phenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-biphenyltetracarboxylic acid dianhydride, ethylene glycol bis(trimellitic acid) dianhydride, 4,4'-(1,4-phenylene)bis(phthalic acid) dianhydride, 4,4'-(1,3-phenylene)bis(phthalic acid)dianhydride, 4,4'-(hexafluoroisopropylidene)diphthalic acid dianhydride, 4,4'-oxydi(1,4-phenylene)bis(phthalic acid) dianhydride and 4,4'-methylenedi(1,4-phenylene)bis(phthalic acid) dianhydride.

69. A polymer according to claim 44, wherein the polymer comprises less than 50% of monomer units that include a divalent group J.

70. A polymer according to claim 69, wherein the polymer comprises less than 30% of monomer units that include a divalent group J.

71. An optical or electro-optical device according to claim 54, wherein the optical or electro-optical device comprises one or more polymer layers.

* * * * *